United States Patent [19]

Nelson et al.

[11] Patent Number: 5,212,490

[45] Date of Patent: May 18, 1993

[54] ECHO RANGING SYSTEM FOR DETECTING VELOCITY AND RANGE OF TARGETS USING COMPOSITE DOPPLER INVARIANT-LIKE TRANSMISSIONS WITH SUPPRESSION OF FALSE TARGETS

[75] Inventors: David E. Nelson, Rochester; John V. Bouyoucos, Pittsford, both of N.Y.

[73] Assignee: Hydroacoustics, Inc., Rochester, N.Y.

[21] Appl. No.: 851,262

[22] Filed: Mar. 13, 1992

Related U.S. Application Data

[63] Continuation of Ser. No. 711,681, Jun. 6, 1991, abandoned.

[51] Int. Cl.$^5$ ................ G01S 13/536; G01S 15/58
[52] U.S. Cl. ............................ 342/109; 342/111; 342/114; 342/128; 342/159; 367/100; 367/102
[58] Field of Search ............... 367/100, 102; 342/108, 342/109, 111, 116, 128, 189, 114, 159

[56] References Cited

U.S. PATENT DOCUMENTS

| | | | |
|---|---|---|---|
| 3,225,349 | 12/1965 | Thor | 342/132 X |
| 3,798,590 | 3/1974 | Jacobson et al. | 342/189 X |
| 3,866,223 | 2/1975 | Crooke | 342/109 |
| 3,883,871 | 5/1975 | Moore | 342/109 X |
| 3,905,033 | 9/1975 | Moore et al. | 342/132 X |
| 4,035,800 | 7/1977 | Lewis et al. | 342/160 |
| 4,398,274 | 8/1983 | Chotiros | 367/100 X |
| 4,697,186 | 9/1987 | Rock | 342/189 |
| 4,933,914 | 6/1990 | Feintuch et al. | 367/87 |
| 5,077,702 | 12/1991 | Whyland | 367/100 |

Primary Examiner—Gilberto Barrón, Jr.

[57] ABSTRACT

False target (reverberation, clutter, etc.) detection is suppressed in an echo ranging system (sonar or radar) in which target velocity and range are measured using a composite Doppler invariant-like signal having at least two segments, such as are present in a "rooftop" or "vee" HFM signal, such composite signal having an ambiguity function with two or more ridge lines of different slopes that intersect along the zero-velocity time axis. A bank of matched filters provides a distribution of outputs which has an ambiguity function-like character with intersecting pairs of ridge lines, the intersecting points of said pairs characterizing the range and velocity of the echo returns. This distribution is adjusted so that the intersecting ridge lines of each pair have equal and opposite slopes with respect to the time axis. In particular, fixed reverberators, which would have ridge lines intersecting on the zero-velocity time axis, would be symmetrical about this axis. A target with velocity v would present ridge lines intersecting along the v-velocity time axis and be symmetrical about that axis. Thus, the reverberation and the moving target would each have crossed ridge lines whose characteristic intersecting patterns would each exhibit symmetries, but about separate and distinct axes. False targets, including clutter and reverberation, are suppressed by subtracting from the adjusted output distribution, a replica thereof, folded (rotated) 180° about a time axis containing the intersection of the ridge line pair corresponding to the false target which is to be suppressed. The rotation and subtraction of the replica from the adjusted distribution provides a set of outputs from which the real target velocity and range can be determined. The rotation-subtraction process can be implemented on an on-going basis to suppress a plurality or continuum of false targets and to achieve a desired width of a Doppler notch covering an arbitrary range of velocities.

22 Claims, 34 Drawing Sheets

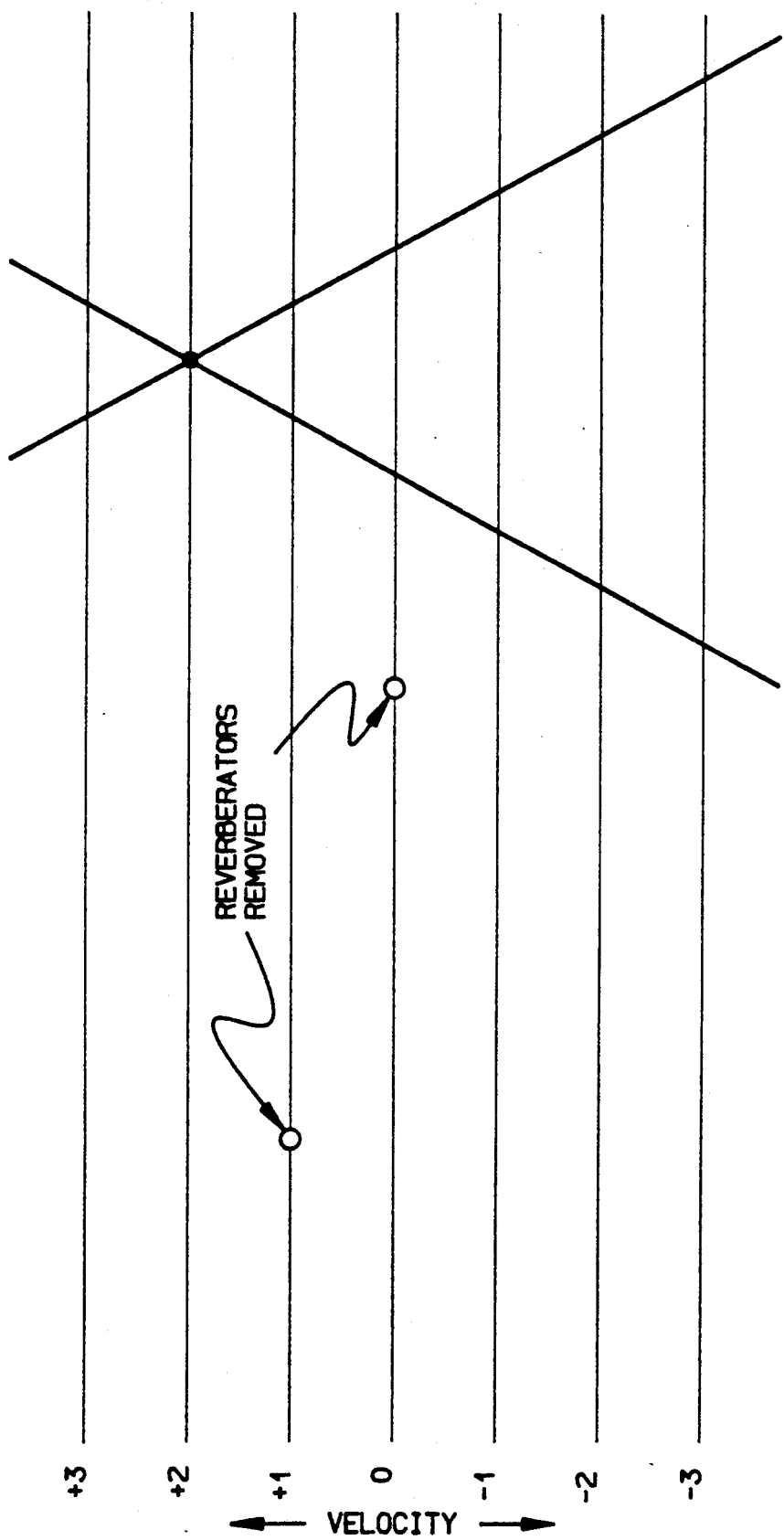

ECHO RANGING SYSTEM FOR DETECTING VELOCITY AND RANGE OF TARGETS USING COMPOSITE DOPPLER INVARIANT-LIKE TRANSMISSIONS WITH SUPPRESSION OF FALSE TARGETS

This is a continuation, of application Ser. No. 07/711,681, filed Jun. 6, 1991 now abandoned.

DESCRIPTION

The present invention relates to echo ranging systems, and more particularly to a system for detecting the velocity of a target from a return in response to a composite Doppler invariant-like transmission, while suppressing unwanted returns, such as returns from objects which do not move (known as clutter in radar and reverberation in sonar).

The invention is especially suitable for use in an echo ranging system described in U.S. patent application Ser. No. 07/671,060 filed Mar. 18, 1991 in the name of David E. Nelson and having a common assignee herewith, namely a system wherein the simultaneous high resolution measurement of the ranges and velocities of targets are afforded by an implementation of coherent velocity analysis through the use of one correlator per composite signal segment together with a tapped delay line and summer network, which provides a simple and practical bank of matched filters wherein each filter is matched individually to a return from a target having a separate and unique velocity. The invention may also be used in echo ranging systems having a conventional bank of matched filters, such as a bank of N correlators whose individual replicas are a set of N signals having time bases adjusted to match N velocities to be detected.

The unwanted return (false target) suppression features of the invention are useful with composite transmissions which have Doppler invariant-like characteristics, and have a large time-bandwidth product (i.e., a time bandwidth product which is greater than one).

Doppler invariance is a concept well known in the field of high resolution radar and sonar where matched filters, such as replica correlators are used. Doppler invariant signals are signals where the matched filter output is independent of target velocity. Such signals are discussed in detail in the text, Principles of High Resolution Radar by A. W. Rihaczek. This text was first published in 1969 and a new edition was published by Peninsula Publishing, Los Altos, Calif. 94023 in 1985. Doppler invariance was a solution to the loss of correlation due to range rate. However, the coupling of range and range rate produced uncertainty in the range output. The Doppler invariance characteristic of a signal is shown by its ambiguity function which is the matched filter response of this signal to Doppler shifted versions thereof, as displayed on the velocity-time plane. The problem of uncertainty and the ambiguity function of different signals and the concept of Doppler invariance is set forth particularly in Sections 4.4 and 6.5 of the Rihaczek text referenced above. Various Doppler invariant waveforms and their ambiguity functions are discussed in Section 6.3 through 6.5 of the text, as well as elsewhere in the text.

A particularly useful Doppler invariant waveform is the hyperbolic frequency modulation (HFM) waveform which is produced during a sweep in frequency of the form $$f_i = F/(1-kt)$$

where F and k are constants, $f_i$ is the instantaneous frequency, and t is time. These constants may be varied to establish the frequency range and/or duration of the sweep. The name "hyperbolic" comes from the mathematical term, $1/t$, in the description of this frequency vs. time characteristic. The ambiguity function of such a signal for an upsweep, (as illustrated in FIG. 1 of the accompanying drawings) is shown in FIG. 2. The ambiguity function of an HFM down sweep signal (as illustrated in FIG. 3) is shown in FIG. 4. A mathematical and qualitative description of the HFM signal and the Doppler invariance thereof is discussed in Section 12.1 of the Rihaczek text referenced above. In the ambiguity function, the time axes for different velocities extend horizontally. They are referred to herein as velocity time axes. The velocities for incoming and outgoing targets are indicated by the minus and plus signs, respectively. The velocity axis is perpendicular to the time axes.

Waveforms of a composite nature have been proposed. These usually contain successive up and down sweeps. When an upsweep is followed by a down sweep, the signal is referred to as a "rooftop" signal. Where a down sweep is followed by an upsweep, the signal is referred to as a "vee" signal. Such signals are discussed in Section 6.3 of the Rihaczek text. A rooftop HFM signal is shown in FIG. 5 of the accompanying drawings and the ambiguity function thereof is shown in FIG. 6. As shown in FIG. 6, the ambiguity function is characterized by ridge lines within the velocity-time plane of the ambiguity function, which ridge lines are of different slope. While the use of HFM signals is presently preferred, the unwanted signal suppression features of the present invention are applicable wherever large time bandwidth composite signals having Doppler invariant-like characteristics are used.

Whereas the term "Doppler-invariant" is being used throughout this specification to denote a preferred signal waveform (perhaps, best represented by HFM or Hyperbolic Frequency Modulated signals), other related signal forms may be used as long as the correlation loss encountered with Doppler shifted returns is found acceptable. One such signal could be, for example, Linear Frequency Modulated (LFM) signals. For small velocity shifts the performance differences between HFM and LFM may be negligible. Any signal may be considered Doppler-invariant as long as the correlation loss for the greatest Doppler-shifted return to be encountered is considered acceptable to the user.

The above-referenced application affords a processor which obtains velocity and range sensitive target detection from such composite Doppler invariant signals having segments of different slope as shown in FIG. 6 (wherein the different slopes are in opposite directions) even though the individual signal segments themselves are Doppler invariant-like. This processor utilizes a rooftop or vee composite Doppler invariant-like signal, or a simultaneous composite signal where the sweeps occupy the same time interval, characterized by its possessing velocity measurement sensitivity inspite of the Doppler invariant nature of the individual segments of the signal. The signal segments of the composite Doppler invariant signal occur successively during a transmission in the case of the roof top signal shown in FIG. 5. The signal segments can occur simultaneously during the transmission as shown in FIG. 5A. The ambiguity function of such a signal, either with successively or simultaneously occurring segments, as illustrated in FIG. 6, possesses two ridge lines that intersect to form an X pattern having a peak at the crossover point on the zero-velocity time axis. There results a direct relationship between the time separation of the crossed ridge lines and the velocity axis which provides a direct means for the measurement of target velocity. A local time base is introduced, enabling velocity to be obtained from the processing of each composite return. It was found that the Doppler invariant nature of the segments of the composite signal provides a constant amplitude for the ridges, between which the time delay can be measured, thereby yielding a velocity measurement sensitivity that is invariant to velocity magnitude. Such time delay measurements may be implemented by a set of tapped delay lines and summers which output a coherent correlation-like detection peak in a bin corresponding to the target velocity. The use of one correlator for each segment of the composite signal together with a tapped delay line and a summer network for coherent combination of the outputs from the correlators provides a matched filter much simpler than a conventional matched filter bank, and is a practical and low cost means for the simultaneous high resolution definition of range and velocity for a target in an echo ranging system; the range being determinable by measuring the time delay between the transmission of the signal and the occurrence of the correlation-like detection peak of the target echo in the summer outputs along the time axis.

It will be understood that, while the use of a matched filter comprising the delay and summer network as mentioned above is preferred for reasons of simplicity and economy, false target suppression according to this invention can also be achieved with a matched filter using a conventional bank of N correlators, when using the composite Doppler invariant-like transmissions described herein.

Radar and sonar systems are often used in environments where there are a multiplicity of stationary targets, or clutter, that are detrimental to the detection objective at hand. These stationary targets may obscure the targets of interest—those which are moving, like aircraft, missiles, or submarines (i.e., a real target).

It is the principal feature of this invention to add to echo ranging systems using a matched filter processor, either implemented conventionally or with the system of the above-referenced application, the capability of suppressing detection of unwanted returns especially those due to clutter and reverberation, thus exposing valid target echos otherwise obscured by clutter or reverberation and avoiding spurious target detections.

In radar and sonar, when using large time-bandwidth signals and matched filter detection, clutter have been suppressed by employing a moving target indicator (MTI). In this technique, the returns from successive transmitted signals from objects which do not move are subtracted from one another. But a moving target appears at different times upon successive transmissions, due to its notion, and hence the echoes do not subtract from one another. The echo-to-clutter ratio is thus improved.

Another known technique employs a signal with an ambiguity function which shows high resolution in the frequency (also called Doppler or velocity) domain. Then moving targets emerge as outputs of individual matched filters (or correlators) each of which has a reference replica corresponding to a specific target velocity. Since the matched filters for targets with finite velocity will not respond to targets with zero velocity (clutter), the echo-to-clutter ratio is improved.

The first (MTI) technique is highly effective in radar, where a fast pulse rate can be employed because of the very high speed of electromagnetic waves. This fast pulse rate insures that the clutter is stable from ping-to-ping and subtracts well. The typical target, such as an aircraft or a missile, has high velocity and thus moves significantly between pulses, thereby escaping the subtraction process and making the target visible to the radar.

In sonar, the velocity of propagation is relatively much slower, and, as a result, reverberation from one ping may extend well into, and even beyond the next ping interval. For low reverberation environments, multiple pings, closely spaced in a band-reuse mode, may be used to measure "range rate". Alternatively, a Doppler sensitive code can be employed, and may be advantageous as it separates a moving target from the clutter on each ping. A commonly used signal for velocity detection is a CW pulse, but in many cases the poor range resolution achieved makes this choice unacceptable. Another form of signal is frequency shift keying (FSK), which, while effective, has several drawbacks which may reduce its usefulness.

It has been discovered that the suppression of clutter or reverberation, or of other unwanted echo returns, can be realized by the transmission of certain composite signals whose echo returns from real and false targets exhibit certain distinguishing symmetries. In particular, if the returns are processed by a matched filter processor, such as a conventional bank of correlators or by the processor of the above-referenced U.S. patent application, Ser. No. 07/671,060, and are then displayed as an output distribution in ambiguity space (i.e., a space containing the perpendicular velocity and time axes in a plane, with the signal amplitude displayed orthogonally to this plane), the returns will be characterized by pairs of crossed ridge lines whose intersection points define individually the time (range) and the velocity of a given return. Each of these pairs of crossed ridge lines can exhibit symmetry about the time axis passing through the point of intersection of the pair. In particular, fixed reverberators, which would have ridge lines intersecting on the zero-velocity time axis, would be symmetrical about this axis. A target with velocity v presents ridge lines intersecting along the v-velocity time axis and would be symmetrical about that axis. Thus, the reverberation and the moving target would each have crossed ridge lines whose characteristic intersecting patterns would each exhibit symmetries, but about separate and distinct axes.

It has been found, in accordance with the present invention, that a subtraction process, based on the separate and distinctive symmetries, selectively eliminate one pattern while retaining the other(s), such as to cancel, for example, the zero Doppler reverberation while continuing to display the non-zero Doppler targets. The subtraction process can, in addition, provide for the subtraction of non-zero velocity unwanted returns; for example, reverberation, such as might occur with Bragg-shifted surface reverberation. The subtraction process also can be used to control the "width" of the Doppler-notch by multiple subtractions.

A selective subtraction process is implemented in accordance with the invention by extracting a replica of the detected output pattern on the velocity-time plane, rotating it 180° about the time axis containing the intersection of a ridge line pair corresponding to an unwanted return, to create a replica of negative amplitude, and adding this rotated (negative) replica back on to the velocity-time plane in proper time alignment, thereby combining the detected output pattern (the output distribution) with the rotated replica to provide an output distribution in which returns from reverberators and false targets are suppressed and from which target velocity and range of actual targets can be derived. Because reverberators are suppressed, the potential for detection of real targets is enhanced.

To achieve full subtraction and suppression, the crossed-ridge line pattern to be nulled must exhibit symmetry about the time axis passing through the intersection point, i.e., the ridge lines pairs emerging from the velocity-time plane desireably must have equal but opposite slopes with respect to the time axis. Ridge lines generated by an upsweep and a downsweep HFM transmission having the same starting point and ending point in frequency, with each sweep having the same time duration, will not possess, in ambiguity space, perfect symmetry. In particular, the slopes of each ridge line of a pair of intersecting ridge lines will not be exactly equal and opposite with respect to the time axis, and if not corrected, will yield sub-optimal reverberation suppression.

Accordingly, to achieve the symmetry required in ambiguity space, thereby to gain maximum suppression of unwanted returns, the sweep bandwidth and/or the sweep time for one segment of the transmitted composite signal is, in accordance with the invention, altered relative to the sweep bandwidth and/or sweep time of the other segment. Alternatively, delays in the distribution of outputs, which delays may be interposed after the matched filter processor, can be incrementally adjusted to achieve the desired symmetry.

When the replica is rotated about the zero velocity axis, this effectively cancels the symmetrical zero Doppler returns while leaving the asymmetrical returns with non-zero Doppler present. The rotation-subtraction process will cancel echo returns along the axis of rotation, but, unless corrected, it will leave negative excursions from rotated ridge line pairs having intersection points off the axis of rotation. These negative excursions can confuse the display, and, in fact, lead to the introduction of new false targets. Accordingly, the negative excursions are generally to be suppressed (unless they are found useful in a pattern recognition process). This negative signal suppression can be achieved by clamping electrically any negative excursion in the output distribution to zero.

For suppression of targets moving at certain (non-zero) velocities, the above process can be used with replicas of the output distribution rotated 180° about time axes passing through the intersection points of the ridge lines corresponding to these certain velocities. The rotation-subtraction process may be repeated to subtract the non-zero velocity Doppler returns from such targets by shifting the axis of rotation successively to cover the velocity response to be cancelled. Alternatively, the multiple rotations may be performed simultaneously. Accordingly, a "Doppler notch" of finite bandwidth can be defined to suppress, for example, reverberation whose spectrum is smeared by interaction with moving surface waves. The bandwidth of the notch will be determined by the number of rotation (or folding) and subtraction operations.

The foregoing and other objects, features and advantages of the invention as well as a presently preferred embodiment thereof will become more apparent from a reading of the following description in connection with the accompanying drawings in which:

FIG. 22 is a top view from FIG. 21 following a further rotation of the patterns about the positive-velocity time axis of the reverberator as the left side of the view, and zero clamping of negative excursions, showing that the surface reverberator and the zero velocity reverberation are both suppressed;

Figure 11:
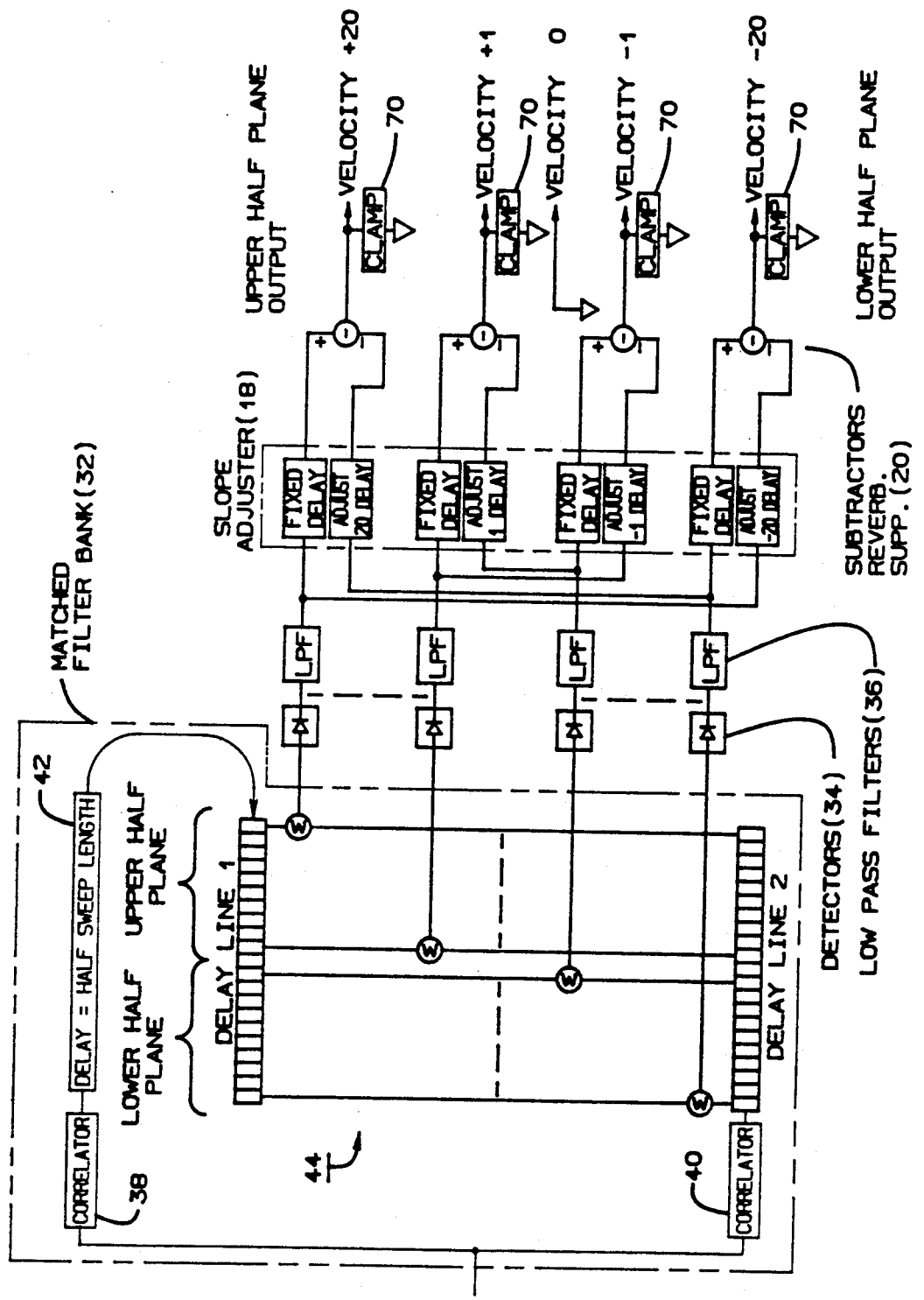
FIG. 11 is a simplified block diagram of the matched filter, slope adjuster and reverberation suppressor of the processor shown in FIG. 9 in accordance with a further embodiment of the invention wherein the matched filter includes the two correlators and tapped delay lines and summer networks of the above-referenced application.
Figure 24:
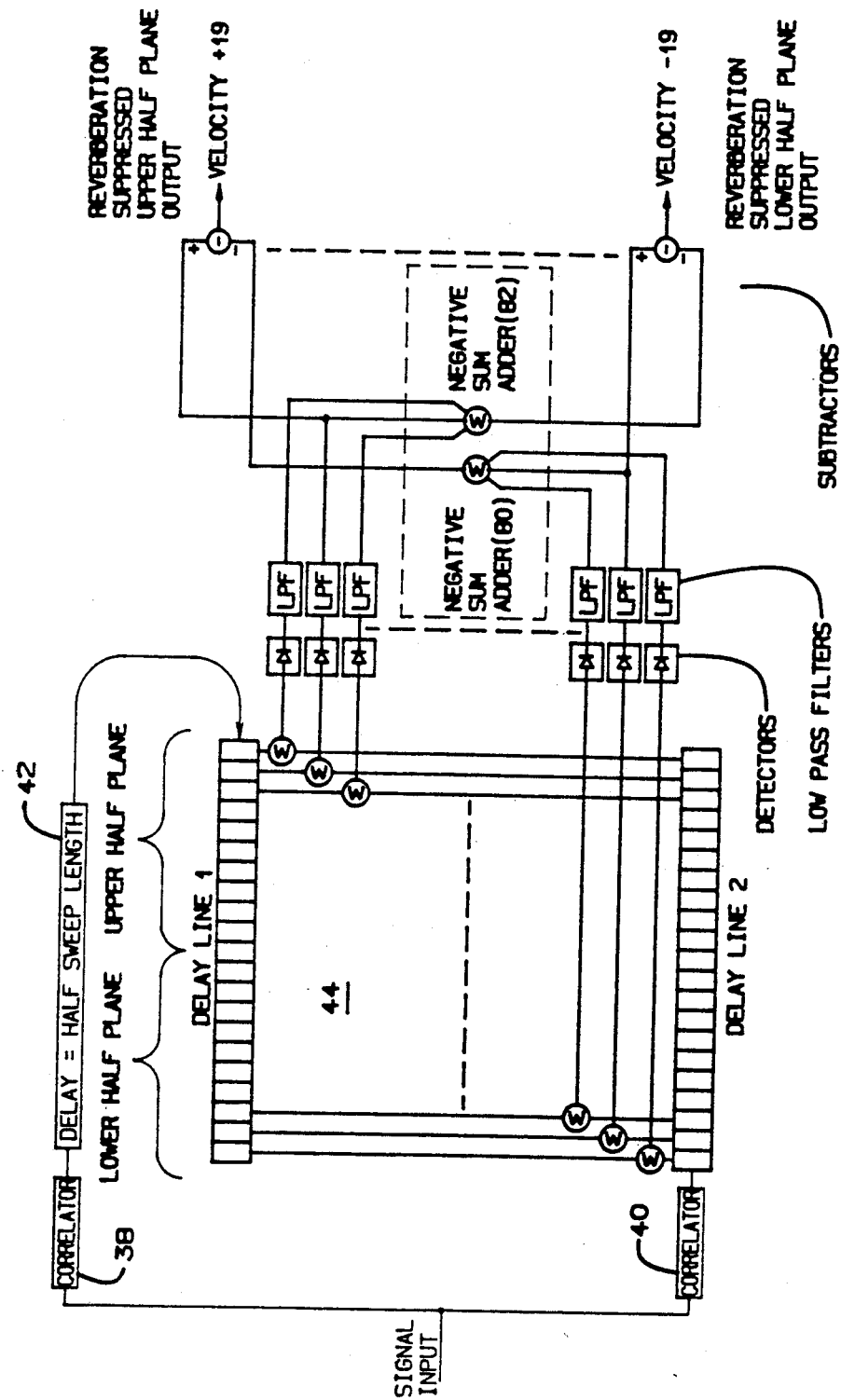
Figure 25:
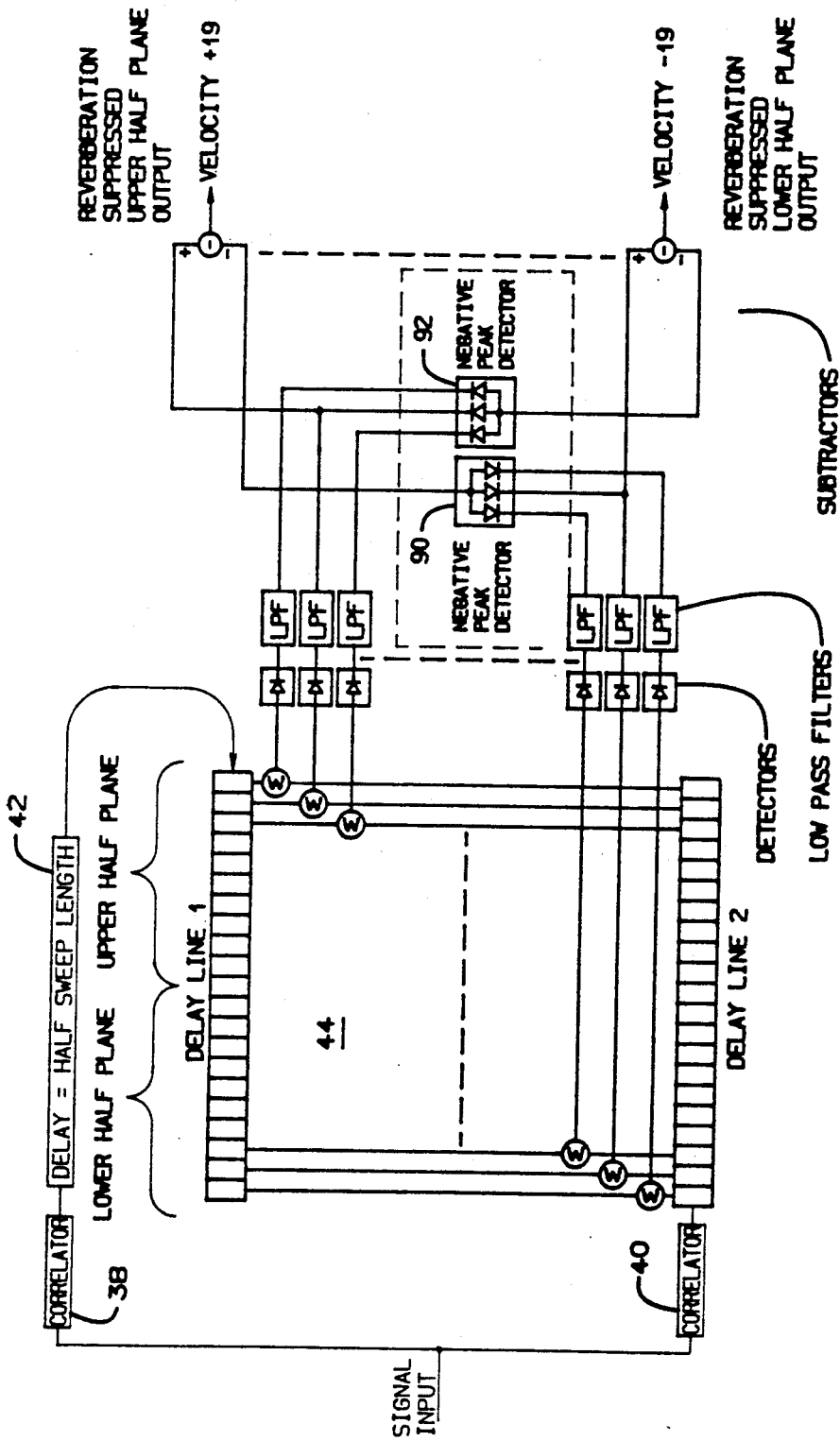
Figure 26:
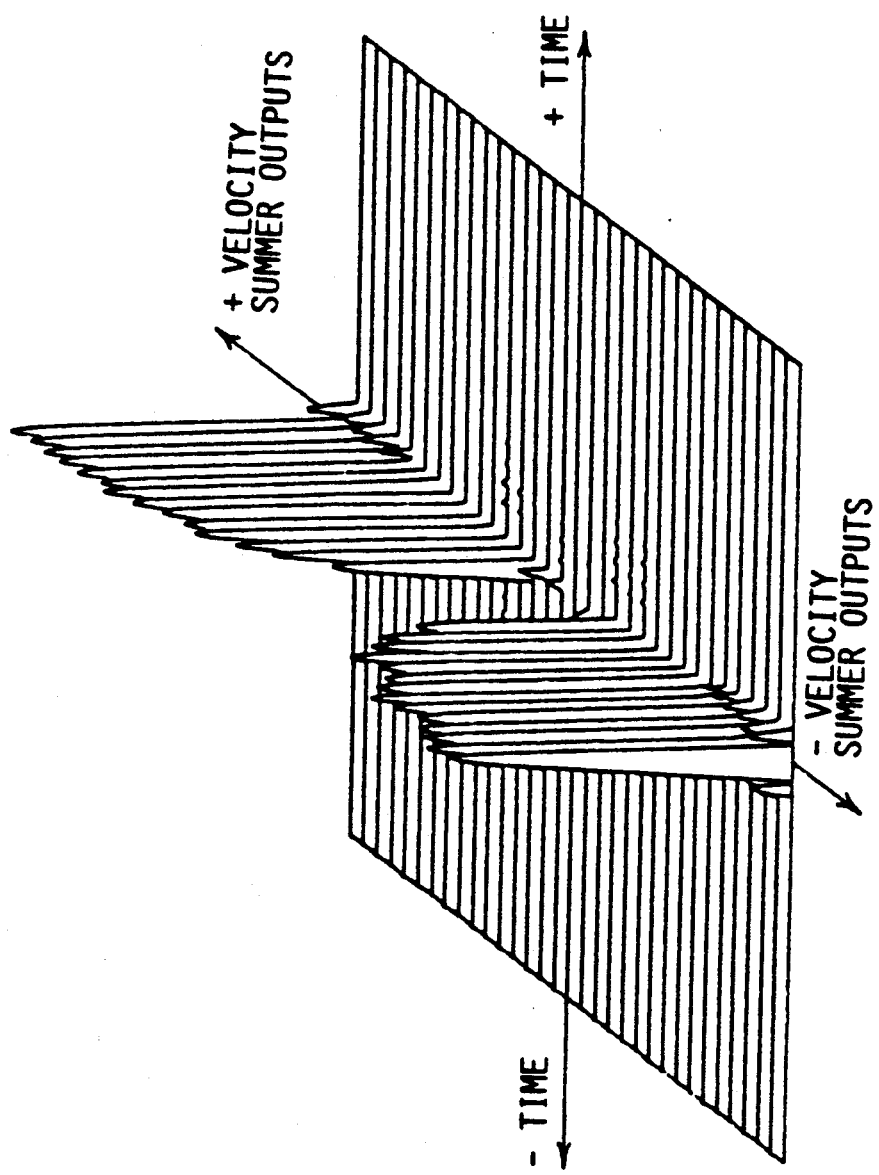

FIGS. 23A–F are plots in ambiguity space from computer simulations of output distributions from a continuum of reverberation showing that the system of this invention provides reverberation suppression for a continuum of stationary reverberators;

FIG. 24 is a block diagram of the same parts of the processor as shown in FIG. 11 for suppression of reverberation or false targets at a plurality of different velocities by simultaneously carrying out a plurality (specifically three) of rotations (about different adjacent velocity time axes) and the subtraction operation;

FIG. 25 is a block diagram similar to FIG. 23 of a further implementation of the processor for simultaneous suppression of a plurality of different velocity reverberations or false targets, which uses peak detectors; and FIG. 26 is a plot in ambiguity space similar to the plots of FIGS. 23A–F, but showing the effective Doppler notch resulting from nine-fold subtraction.

FIGS. 1 through 6, as discussed above, illustrate the building blocks of the presently preferred HFM composite plural segment signal, each segment of which has Doppler invariant characteristics. Referring again to FIG. 6, the ambiguity function for the roof-top composite signal is shown. It possesses two ridge lines that intersect to form an "X", having a peak at the crossover point on the zero-velocity time axis. The above-referenced application describes how this composite ambiguity function provides a direct means for the measurement of target velocity in that there is a direct relationship between the velocity axis of the ambiguity function and the time separation of the crossed ridge lines. The composite signal introduces a local time base enabling velocity to be derived, and the location of the crossover point enables range to be derived simultaneously with the velocity, and without ambiguity. The Doppler invariant nature of each of the segments of the composite signal provides a generally constant amplitude for the ridges, between which the time separations are measured, thereby yielding a velocity measurement sensitively invariant to velocity magnitude.

Figure 7:
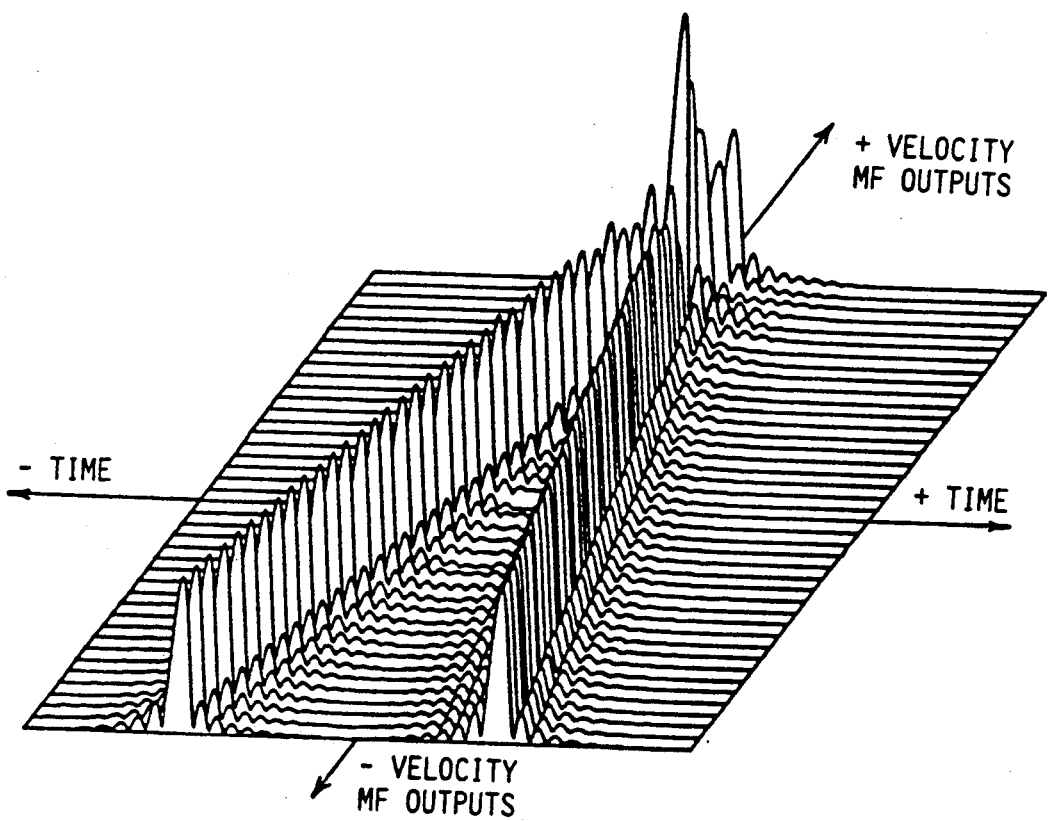
FIG. 7 is a plot of the matched filter output distribution of ambiguity function-like character from a rooftop HFM transmission for an incoming target.
Figure 8:
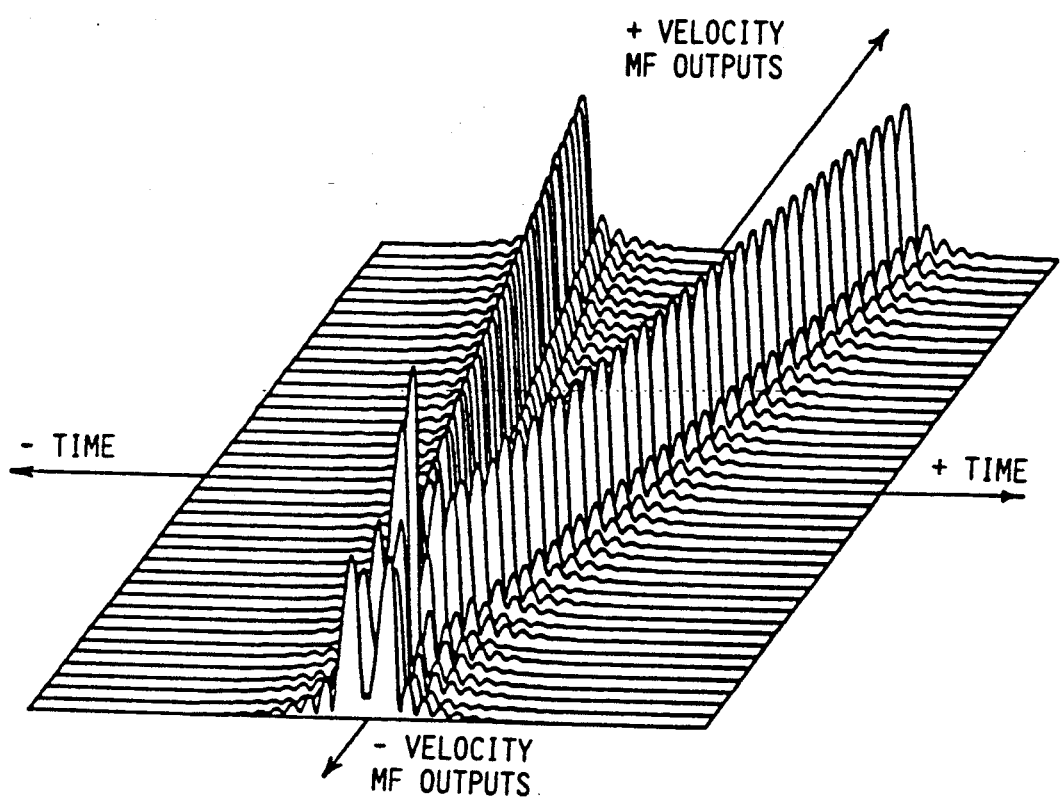
FIG. 8 is a plot similar to FIG. 7 for an outgoing target.

A matched filter processor of the returns from the target (16, FIG. 9) provides a distribution of outputs from which the velocity and range measurements can be made. This processor may be a bank of replica correlators containing a correlator for each velocity to be detected (N correlators), whose individual replicas are a set of N signals having time bases adjusted to match the N velocities to be detected (30, FIG. 10), or the less costly and simpler matched filter bank (32, FIG. 11) as described in the above-referenced application. In either case, the distribution of outputs may be displayed on an ambiguity surface as shown in FIGS. 7 and 8 for outgoing and incoming targets, respectively. These figures illustrate the migration of the cross-over of the ridge lines as a function of target velocity. The intersecting ridgeline format has been found, in accordance with the invention, to be amenable to reverberation and false target suppression by a subtraction process which is discussed above and which is discussed in greater detail hereinafter.

Figure 9:
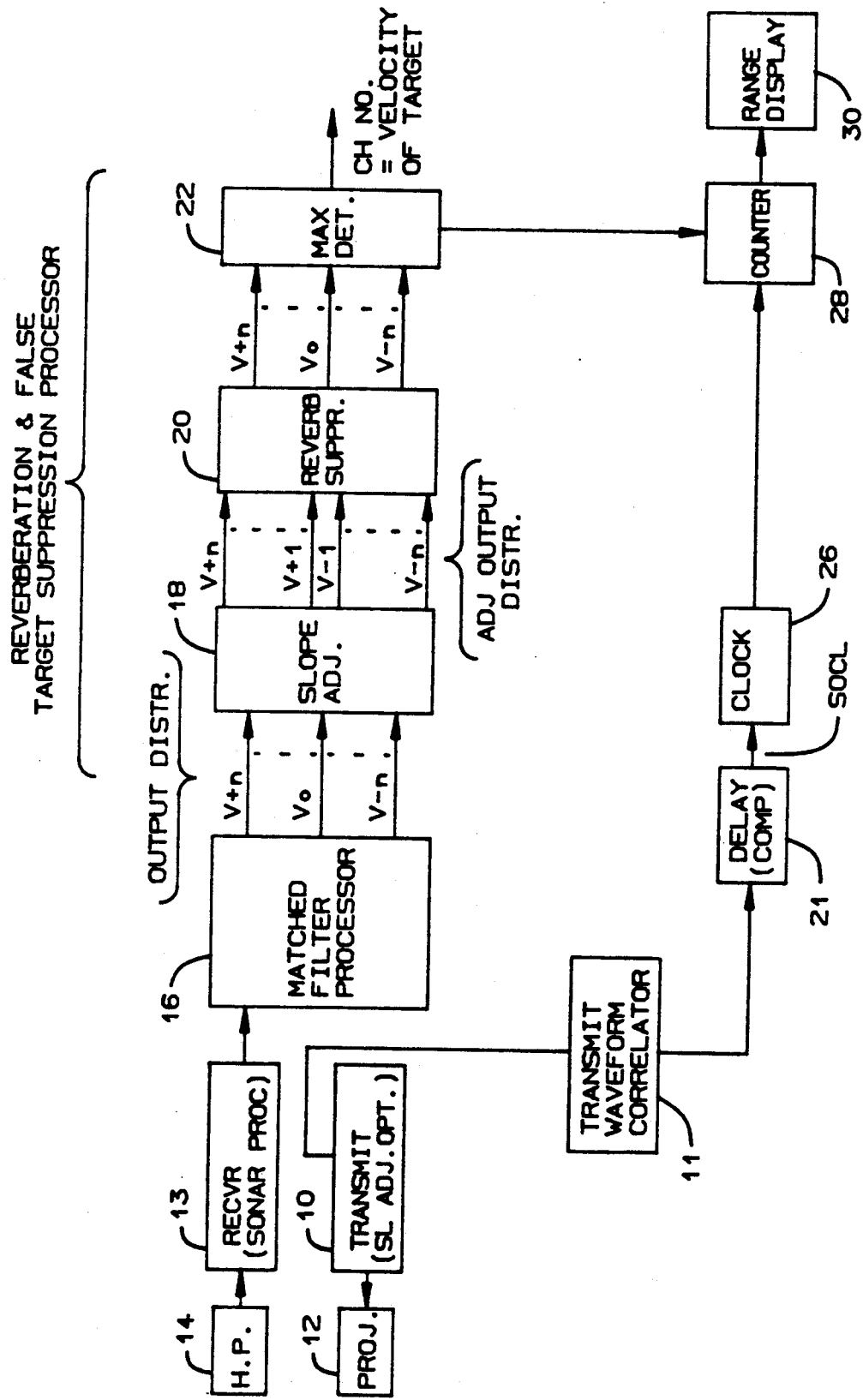
FIG. 9 is a block diagram of a system for simultaneous measurement of velocity and range from a transmission of a composite Doppler invariant signal, containing two sweep segments, upon return thereof after the transmission is incident upon and reflected from a target, wherein means are included for the suppression of reverberation or other false targets.

The transmitter 10 in which the composite Doppler invariant-like signal is generated, as well as its associated projector 12 (for sonar), are shown in FIG. 9. An antenna is used for radar. The signal is received at a hydrophone or hydrophone array 14 (an antenna being used for radar), and applied to a receiver 12 where processing for beam forming and the like, as is conventional in sonar or radar, is performed on the signal. The composite signal segments can modulate a carrier at microwave frequencies in the radar case or at sonic frequencies in the sonar case. At the receiver, the signal may be shifted by conventional heterodying techniques to a convenient frequency for sampling at least at twice the upper frequency limit of the shifted signal to satisfy the Nyquist criteria. At this point in the system the signal samples may be digitized and processed in the matched filter processor 16. This processor may contain frequency domain or time domain correlators. Such correlators are conventional and may be implemented either in software or in application specific integrated circuits. A bank 30 of N correlators for a conventional matched filter processor is shown in greater detail in FIG. 10, and the matched filter processor having only one correlator for each signal segment, as described in the above-referenced application, is shown in FIG. 11.

Referring to FIG. 11, a matched filter bank for a roof-top HFM sweep is shown. There are two correlators, 38 and 40, one for the up sweep segment and the other for the down sweep segment, respectively. In these correlators, the echo is correlated with replicas of the transmitted signal. The replicas may be stored digital replicas which are read out in synchronism with the samples as they are being correlated, all in accordance with well-known correlator or matched filter techniques. A half sweep length delay 42 aligns the outputs of the correlators 40 and 42 in time. These outputs are then coherently combined in the delay and summer network 44 to provide an output distribution having the crossed ridge line presentation discussed above. The delay lines 1 and 2 time align the correlation outputs for summation, with the correlator outputs propagating in inverse relationship therethrough. Forty-one summer outputs provide forty-one velocity bins in the example illustrated in FIG. 11. These delay lines 1 and 2 may be shift registers which should be as wide as the number of bits in each byte of the sampled data which is output from the correlators 38 and 40. The clock rate (also known as tau step) which is used is desirably the same as in the correlators 38 and 40 (i.e., at the frequency at least twice the frequency of the carrier on which the Doppler invariant signal is modulated or its frequency shifted version). However, the length is much shorter than the correlation time and is determined solely by the maximum target velocity which is to be measured. Typically, the delay line lengths may be about 10% of the correlator time delay. The delay lines have taps for each bin which corresponds to a velocity bin. These taps are close to each other in delay in accordance with the resolution of the velocity measurement to be achieved. In the illustrated case, there are twenty bins for outgoing targets and twenty for incoming targets, as well as a zero velocity bin. The correlators 38 and 40 and the delay line and summer matrices constitute a bank of matched filters, each filter of which is matched to a return from a different target velocity. These summer outputs are detected and filtered (for removal of the carrier and smoothing) in detectors 34 and low pass filters 36 (See FIGS. 10 and 11) to provide the distribution of outputs $v_o$ to $\pm v_n$ shown in FIG. 9 (n=20, FIG. 11).

As shown in FIG. 9, the matched filter outputs go to a slope adjuster 18 (in the event that slope adjustment is not carried out on the transmitted waveform in the transmitter 10). The option for slope adjustment in the transmitter 10 is indicated by the legend "SL-ADJ.OPT."

Figure 10:
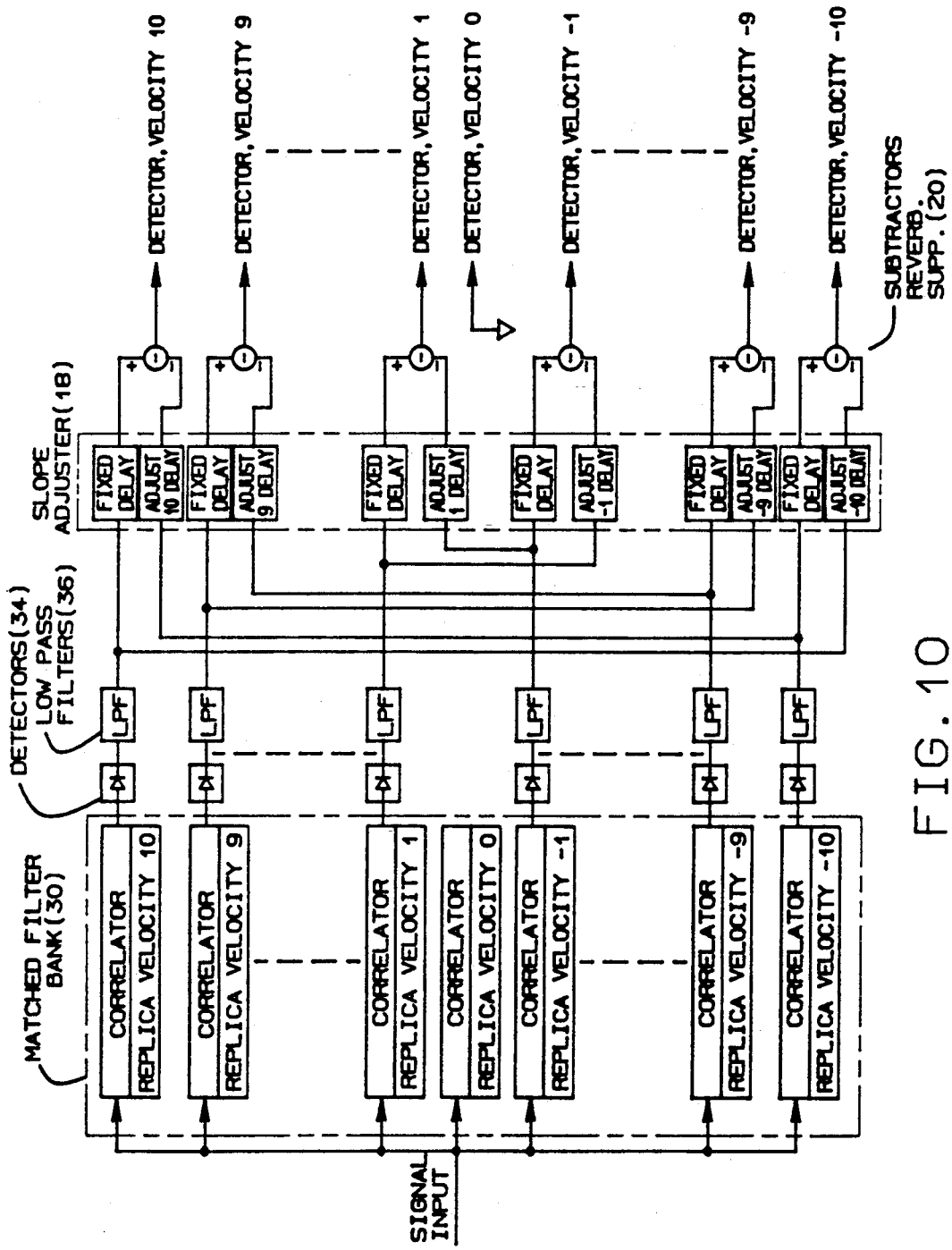
FIG. 10 is a simplified block diagram of the matched filter, slope adjuster and reverberation suppressor of the processor shown in FIG. 9 in accordance with an embodiment of the invention wherein the matched filter is a bank of replica correlators whose replicas match the velocities to be detected.

The slope adjusters 18 are shown in detail in FIGS. 10 and 11. They operate to make the slopes of the ridge line pairs in the output distribution equal and opposite with respect to the time axis of the distribution, thereby achieving symmetry in ambiguity space to gain maximum suppression of the unwanted returns. The slope adjuster 18 provides the adjusted output distribution.

The slope adjustment requires that velocity outputs on one side of zero velocity be delayed prior to subtracting from the other side of zero velocity, and that those on the other side of zero be advanced before being subtracted from those on the first side of zero velocity. Since time advances are impossible, the first step is to apply a bank of equal, fixed delays to the direct outputs. The effect of these delays is to retard the presentation of a target by their delay time.

The second set of delays, which are specific for each and every velocity output (adjustable delays), accomplish the task of advancing or delaying the signal prior to subtraction for reverberation and false target suppression. If their delay is smaller than the fixed delay, it is an advance. If greater, it is a delay. The two would be equal at zero velocity, if they existed.

The direct outputs feed the positive side of the subtractors in the reverberation suppressors 20. The variable (adjustably) delayed outputs feed the negative side of the subtractors, effecting the reverberation suppression.

Returning to FIG. 9, the output distribution, from which reverberators and other false targets (unwanted returns) are suppressed, goes to a maximum amplitude detector 22. The maximum response is obtained by searching for a maximum amplitude above a given threshold (to exclude much of the background noise and possible ambiguous echoes). The output of the detector is a channel number which corresponds the velocity bin and therefore the velocity of the target.

Figure 1:
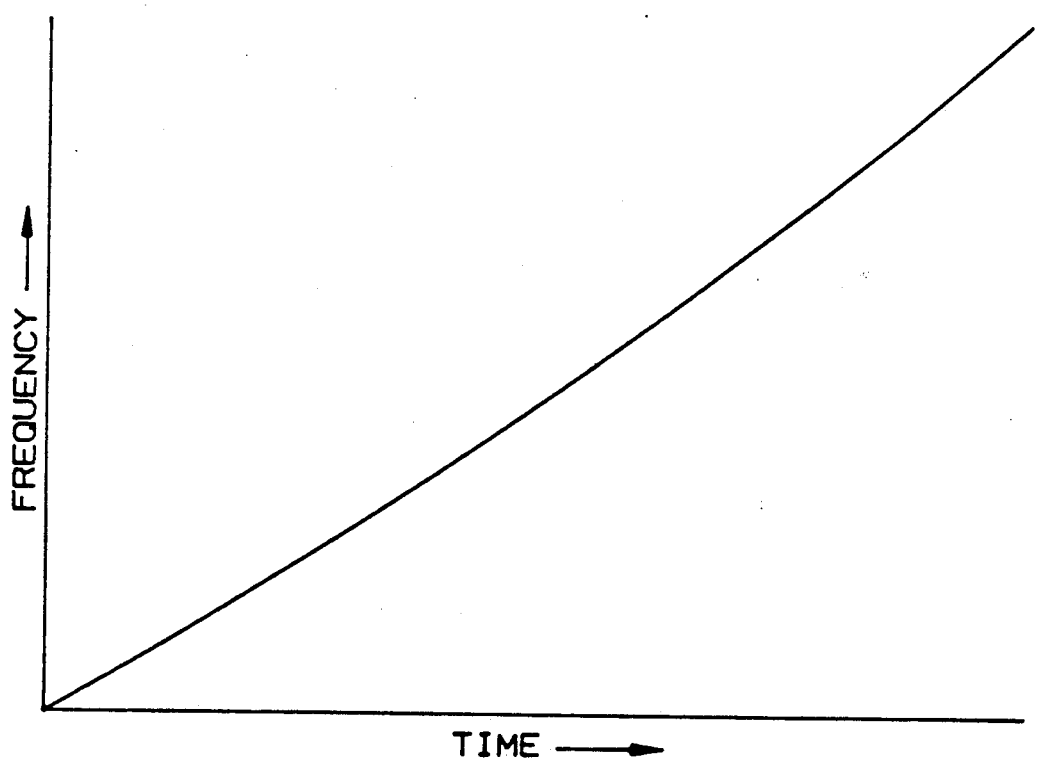
FIG. 1 is a plot of the frequency vs. time characteristic of a conventional HFM up sweep signal.
Figure 2:
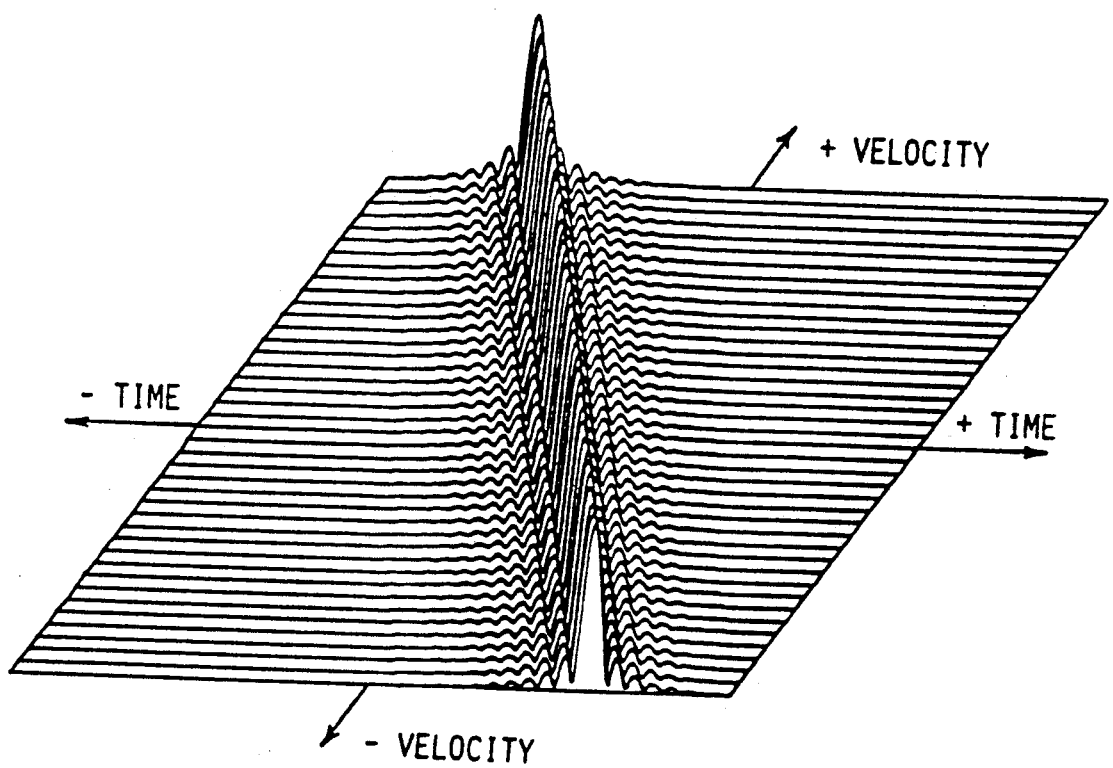
FIG. 2 is a plot of the ambiguity function of an up sweep HFM signal.
Figure 3:
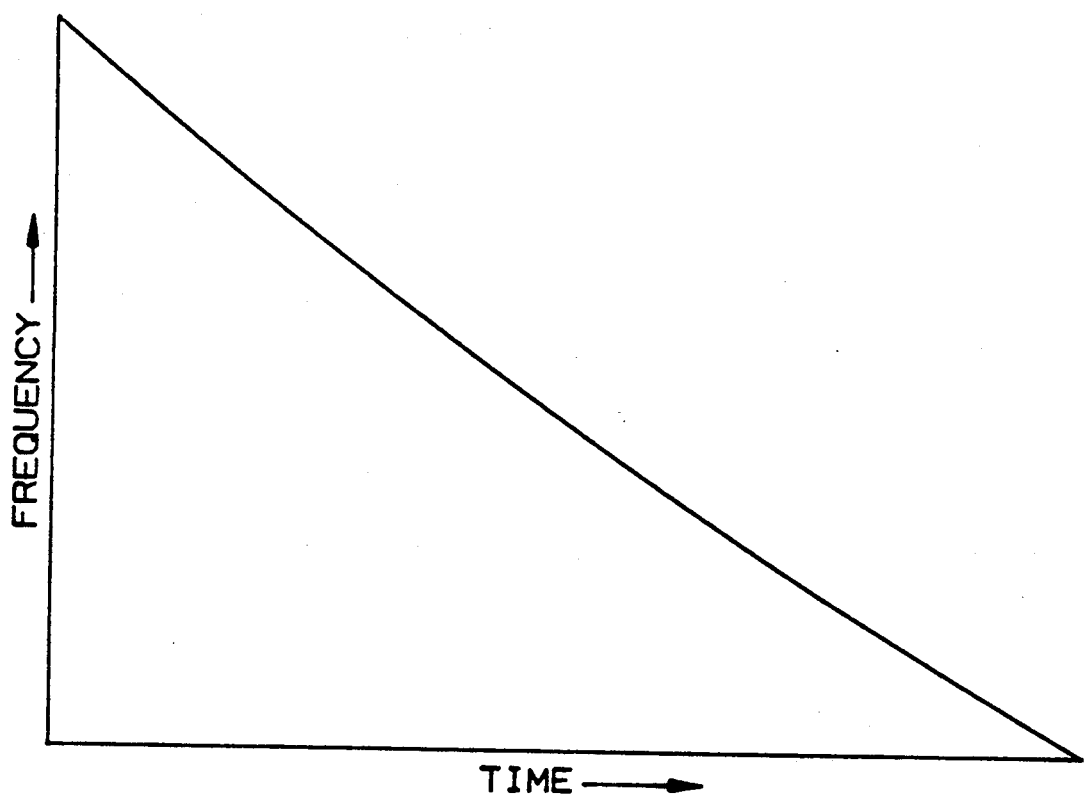
FIG. 3 is a curve showing the frequency vs. time relationship of a down sweep HFM signal.
Figure 4:
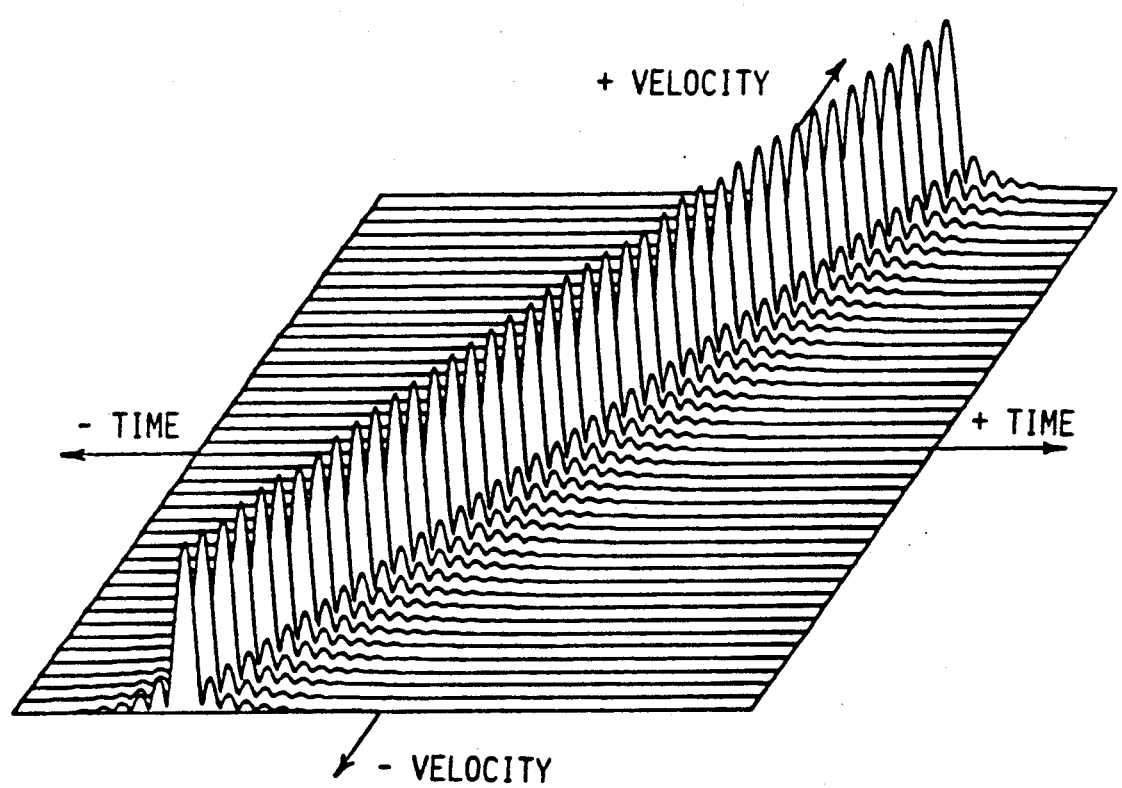
FIG. 4 is a plot of the ambiguity function of a down sweep HFM signal.
Figure 5:
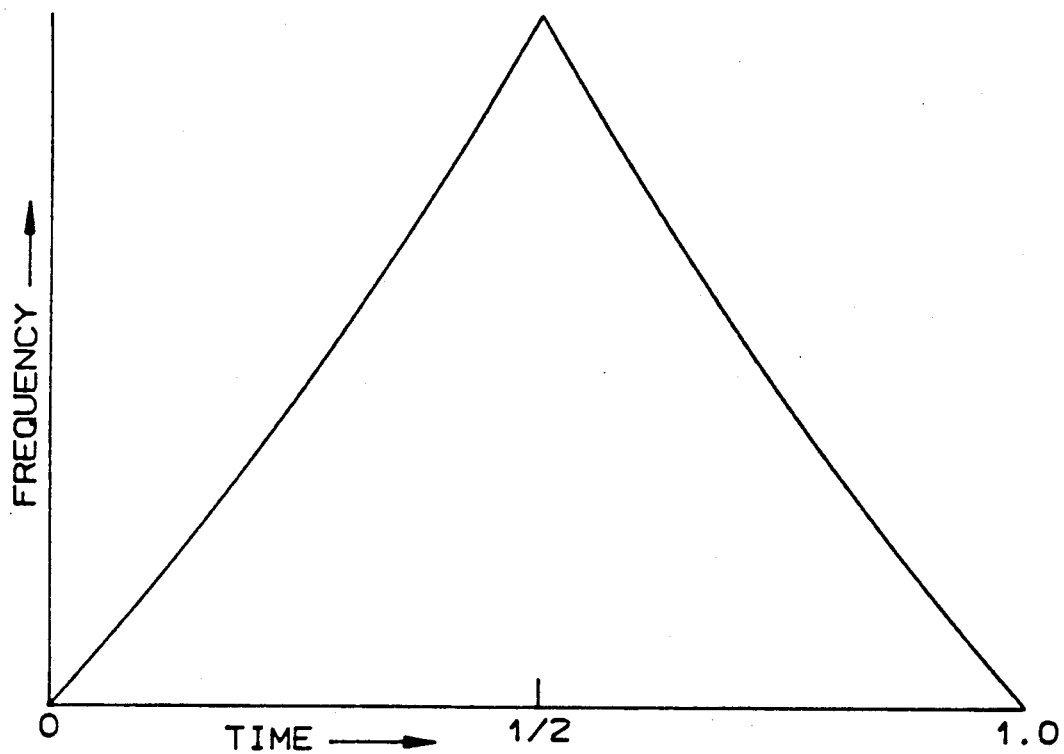
FIG. 5 is a plot of the frequency vs. time characteristic of a rooftop HFM signal.
Figure 5A:
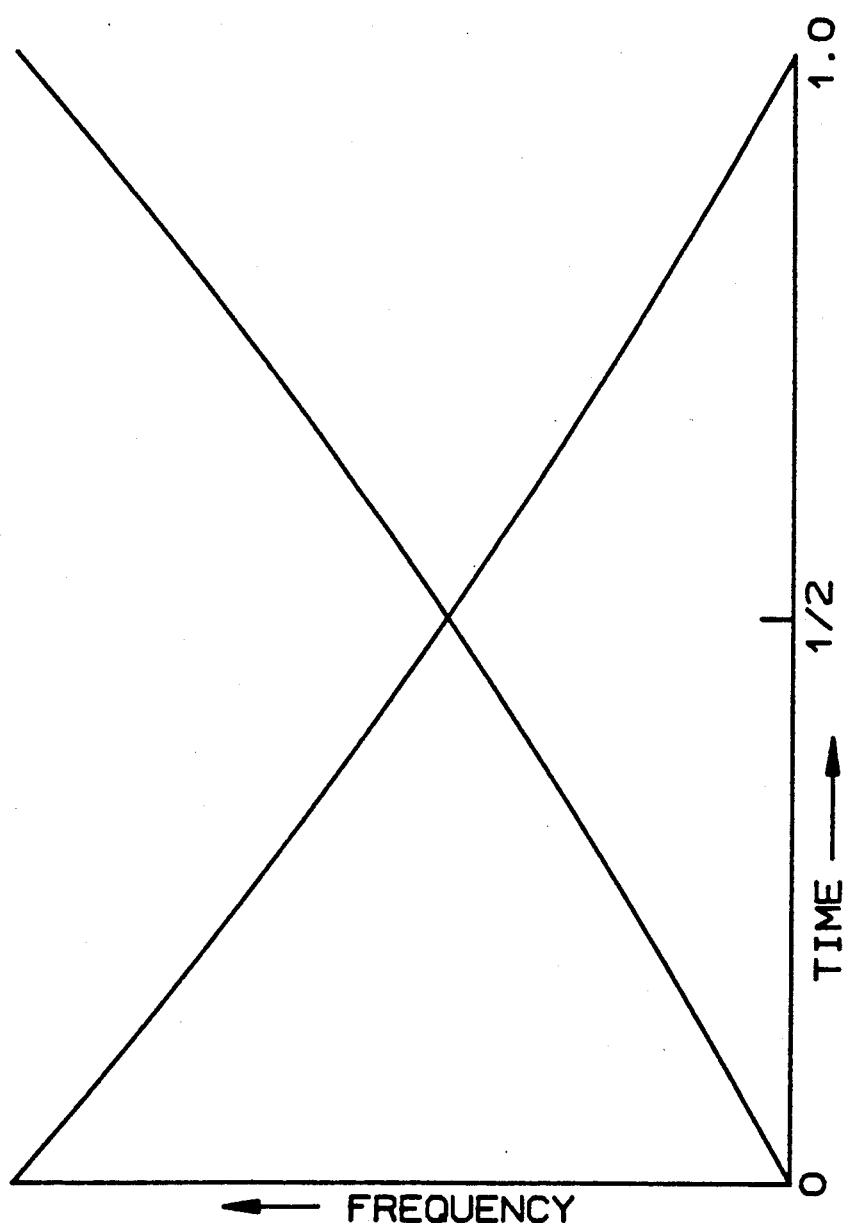
FIG. 5A is a plot of a composite type HFM signal where the signal segments occur simultaneously.
Figure 6:
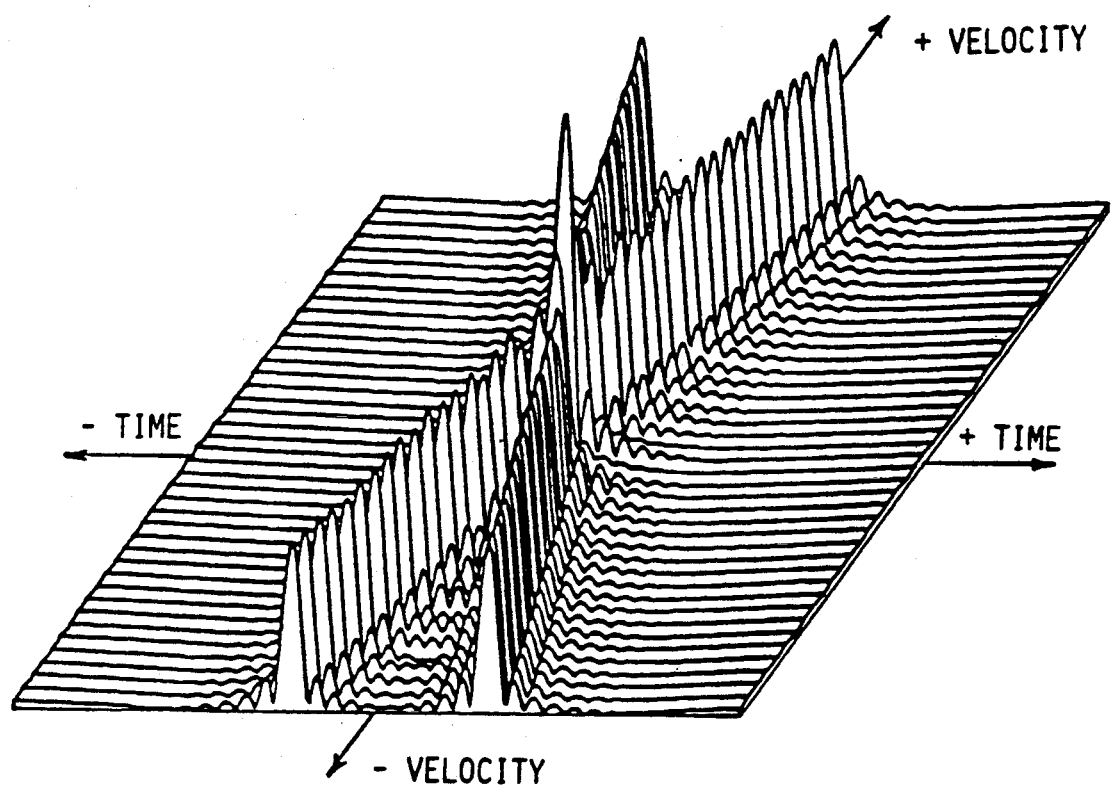
FIG. 6 is the ambiguity function of a rooftop HFM signal.

It will be apparent from FIGS. 6, 7 and 8 that the maximum output occurs at a distinct and unambiguous point with respect to the time axis of the output distribution to represent the range of the target. The range detection may be implemented as shown in FIG. 9 simultaneously with velocity detection. First, a transmit waveform correlator 11 will establish a (zero-velocity) time reference for the transmit waveform (rooftop, vee, or other composite Doppler invariant transmission). This time reference will be established by a peak response, such as shown by the zero velocity matched filter waveform illustrated in FIG. 6, defining start of transmission. Then, a delay network 21 inserts a delay to compensate for delays in the system signal processing. This delay network interposes a delay after a start pulse from the transmit waveform correlator. The delay network 21 outputs a start of clock (SOCL) enable pulse to a clock generator 26. The number of clock pulses which is generated until the time of the maximum or peak amplitude receive signal obtained in the maximum signal amplitude detector 28 is collected in a counter 28. The counter counts the clock pulses from the clock 26 until inhibited by the maximum detector output. The counter 26 thus stores the return time for the echo to return to the receiver. The counter output goes to a range display 38 which may display the range and also, if desired (but not shown), the velocity in terms of the channel number obtained from the maximum detector 28. The counter may alternatively be started by applying the transmitter output as an input to the sonar processor 14 and detecting the detection peak. A first peak effectively occurs at time zero and the time to the detection peak from the target return (the second peak) is measured by running the counter until inhibited by the later detection peak.

Figure 12:
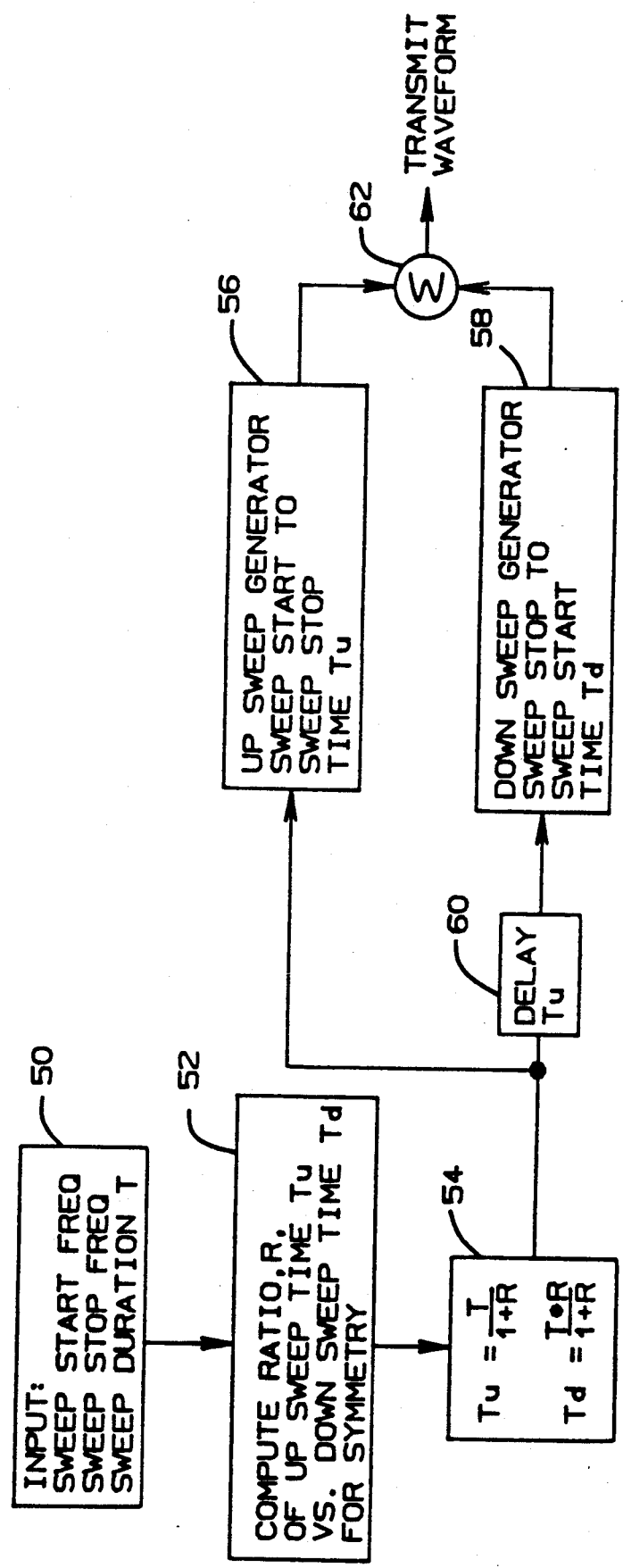
FIG. 12 is a block diagram of a slope adjuster which may be incorporated in the transmitters of the system shown in FIG. 9 to adjust the slope of the ridge line pairs by controlling the sweep bandwith or sweep time of the transmitted signal waveform.

Referring to FIG. 12, there is shown an optional computational program to symmetrize the slopes of the ridgeline pairs in the output distribution to make the slopes equal and opposite with respect to the time axis, thereby to optimize the subtraction process for cancelling unwanted signals. This optional program operates to generate the proper input signal to the transmitter 10 to adjust the relative lengths of the up sweep vs. the down sweep in a composite Doppler-invariant signal.

In the input or intitialization process 50, the first inputs to the computation provided are the lower and upper frequency limits for the HFM sweep segments (called Sweep Start and Stop Freq. in the drawing), which will remain unchanged during the computation. These frequencies are at the discretion of the user. In the preferred mode, they are the same for the up and down sweeps, but they may differ if desired. The second input is the total duration (Duration T) of the up and down sweeps.

The computer then calculates (process 52) the ratio, R, of the up sweep duration, Tu, to the down sweep duration, Td, which will achieve symmetry. This is done using the general expression for an HFM sweep:

$$f_i = F_o / (1 - k(t - T_o))$$

Where $f_i$ is the instantaneous frequency, $F_o$ is the start frequency, k is the constant to execute the sweep in the desired time to the desired stop frequency, and $T_o$ is an arbitrary start time, generally zero for the up sweep if the signal is to be a roof-top HFM signal as used in the example herein described.

The general computational procedure is:

(a) Choose any non-zero time t nominally in the sweep time in use; then (b) calculate the frequency deviation of the up sweep at this time; then (c) the next step is to find the time, $t_d$, at which the down sweep will reach this same frequency (it will be a negative number); and (d) the final step is to adjust k until the magnitude of this time number, $t_d$, equals the magnitude of that initially assumed, t. The two values of k will be different, and their ratio is R. Since the values of $F_o$ and k are different for the up and down sweeps, the time durations must also differ by this ratio R. The new values of Tu and Td are computed in the next process 54 using this ratio, keeping the sum of Tu and Td equal to T, the total sweep interval, including both sweeps.

The newly computed values of k and T for the up and down sweeps are fed to sweep generators 56 and 58 for their use in generating a conventional HFM waveform from a summer 62. A delay 60 is inserted to cause the roof top down sweep to begin at the end of the roof top up sweep.

If the composite Doppler-invariant signals to be transmitted are preconditioned by the above described, or a similar, procedure, the slope adjusters 18 in FIGS. 10 and 11 are unnecessary. In the absence of such proper signal conditioning, the slope adjusters are necessary for the optimum suppression of accumulated returns.

The operation of the reverberation and false target suppressor 20 provided by the invention will now become more apparent from FIGS. 13-26.

Figure 13A:
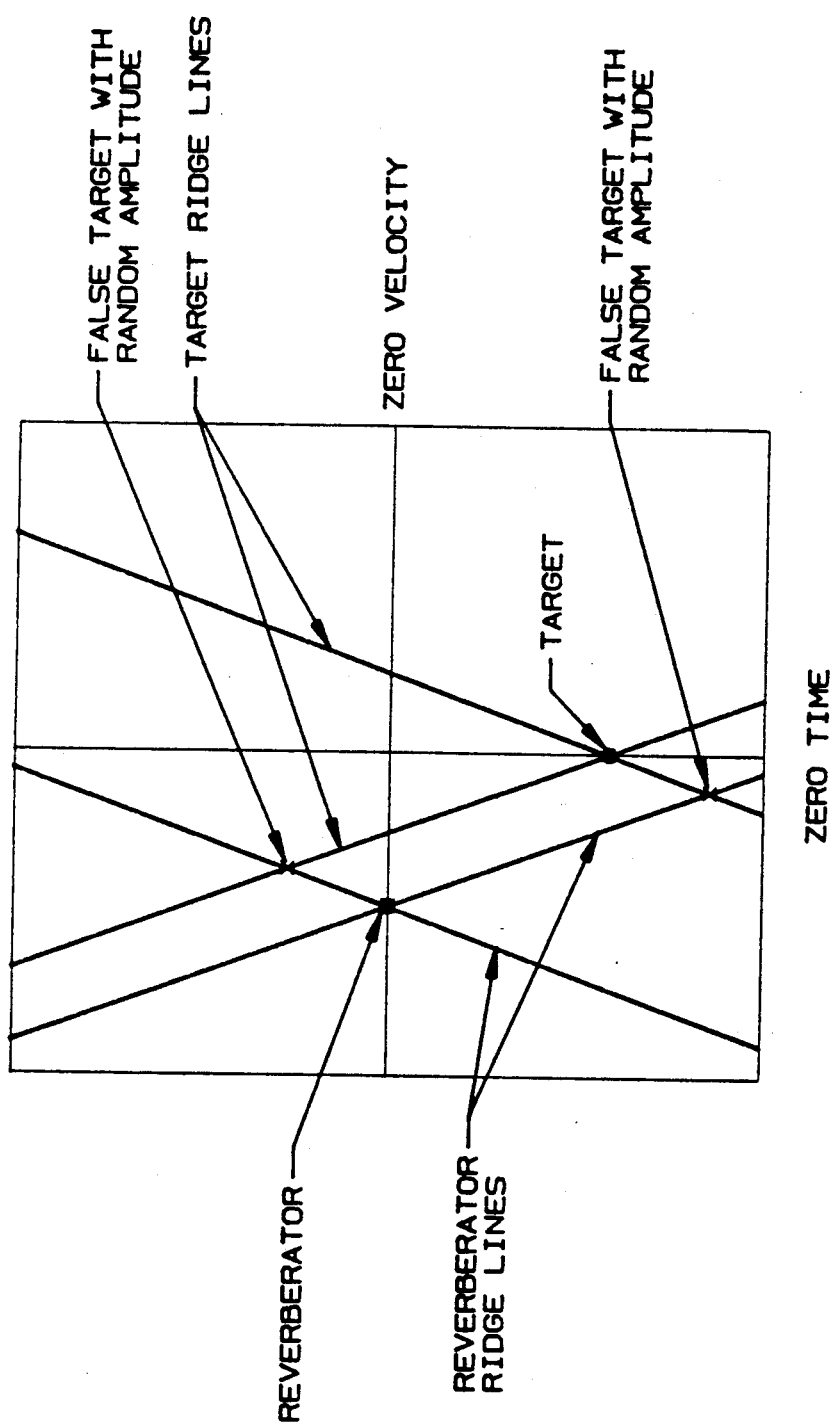
FIG. 13A is a top view in ambiguity space obtained from a slope adjusted output distribution where the transmission is a roof top HFM sweep with returns from a target and from a reverberator.

FIG. 13A shows a top view of an ambiguity-like function plotted from the matched filter bank 16 (FIG. 9) output distribution for two returns; one from a false target (a zero velocity reverberator) and another from a target with velocity. Thus, two pairs of x-shaped ridge lines are shown.

These ridgeline pairs are illustrated having equal and opposite slopes with respect to the time axis. FIG. 13A shows that zero velocity reverberators, whose ridge lines cross at the zero-velocity time axis, possess symmetry about this axis, while the ridge lines from the target with velocity do not possess symmetry about the zero velocity time axis.

Figure 13B:
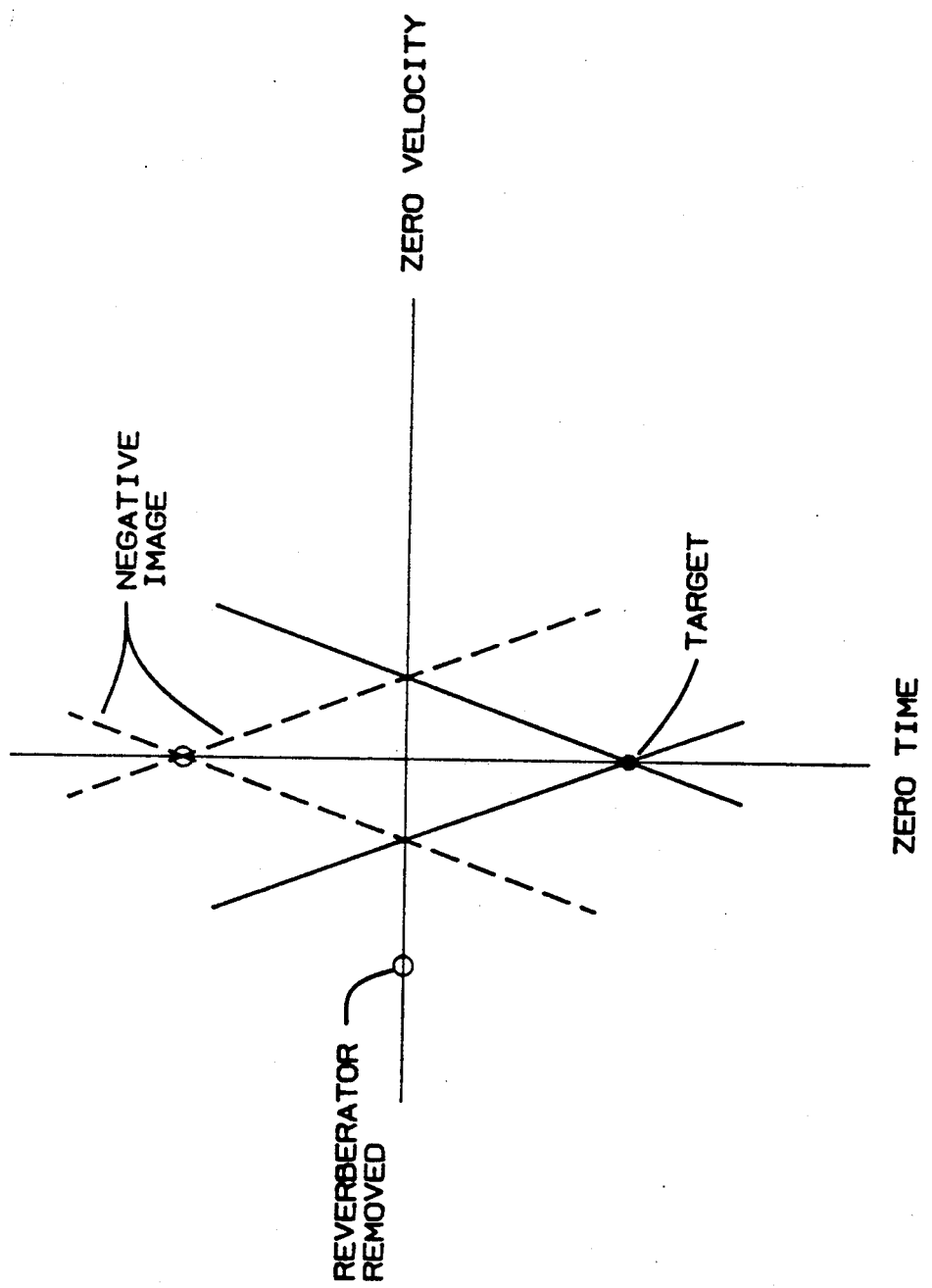
FIG. 13B and FIG. 13C are top views in ambiguity space of the presentation set forth in FIG. 13A, in FIG. B following a single rotation of a replica about the zero-velocity axis with a time-aligned subtraction, the zero-velocity reverberator being removed, leaving the moving target pattern plus its rotated negative image and in FIG. 13C with negative signals clamped.

If a replica of the pattern of FIG. 13A is formed, which replica is rotated 180° about the zero-velocity time axis to form a negative (upside down) image, which negative image is then added back on to the pattern of FIG. 13A in proper time alignment, the zero velocity reverberator ridgelines will be cancelled and the resulting output distribution will appear as in FIG. 13B. Here the original target ridgelines remain, as in FIG. 13A, but a negative image of them is also present.

Figure 13C:
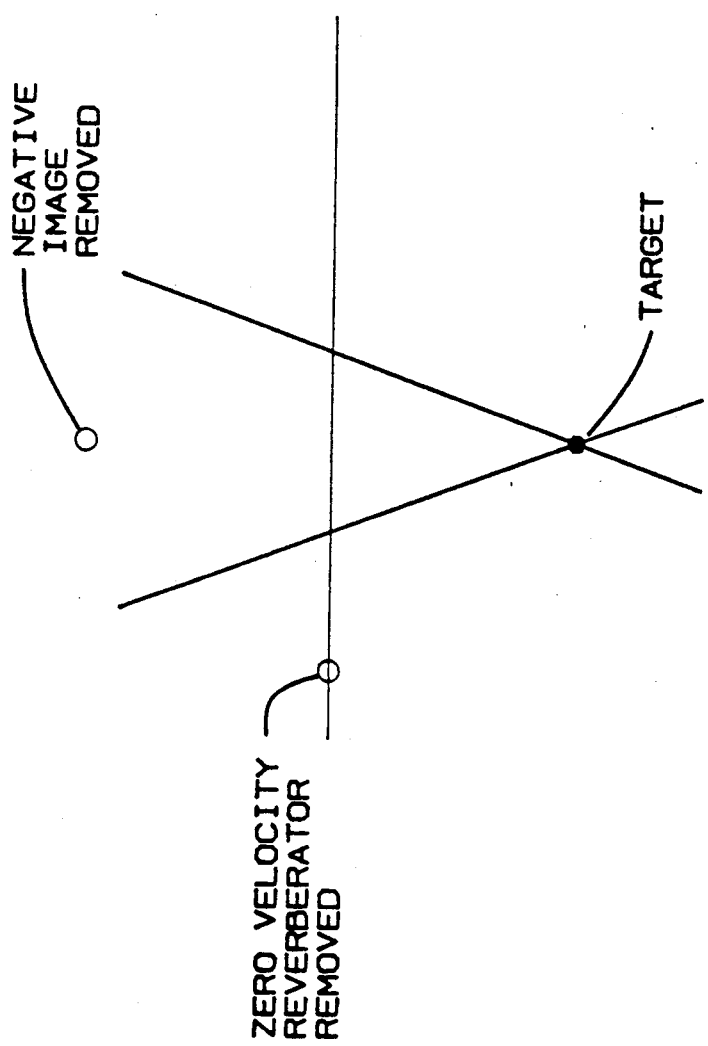

This negative presentation can be removed by electronic clamping of negative signals, as shown in FIG. 13C, to leave the target image standing alone.

The above step-wise visualization of the subtraction process, for patterns symmetrical about the zero-velocity time axis, is accomplished instantaneously and continuously in the circuit diagrams of FIGS. 10 and 11 by interconnections that are symmetrical about the zero velocity in which the −nth output is subtracted from the +nth output, and the +nth output is subtracted from the −nth output, in a bank of n subtractors to yield a new set of 2n outputs, providing for n incoming and n outgoing target velocities, but with the response for targets or reverberators with zero velocity being suppressed.

The above process can be extended to provide for suppression of returns at any velocity or for a multiplicity of velocities as will be set forth hereinafter.

Figure 14:
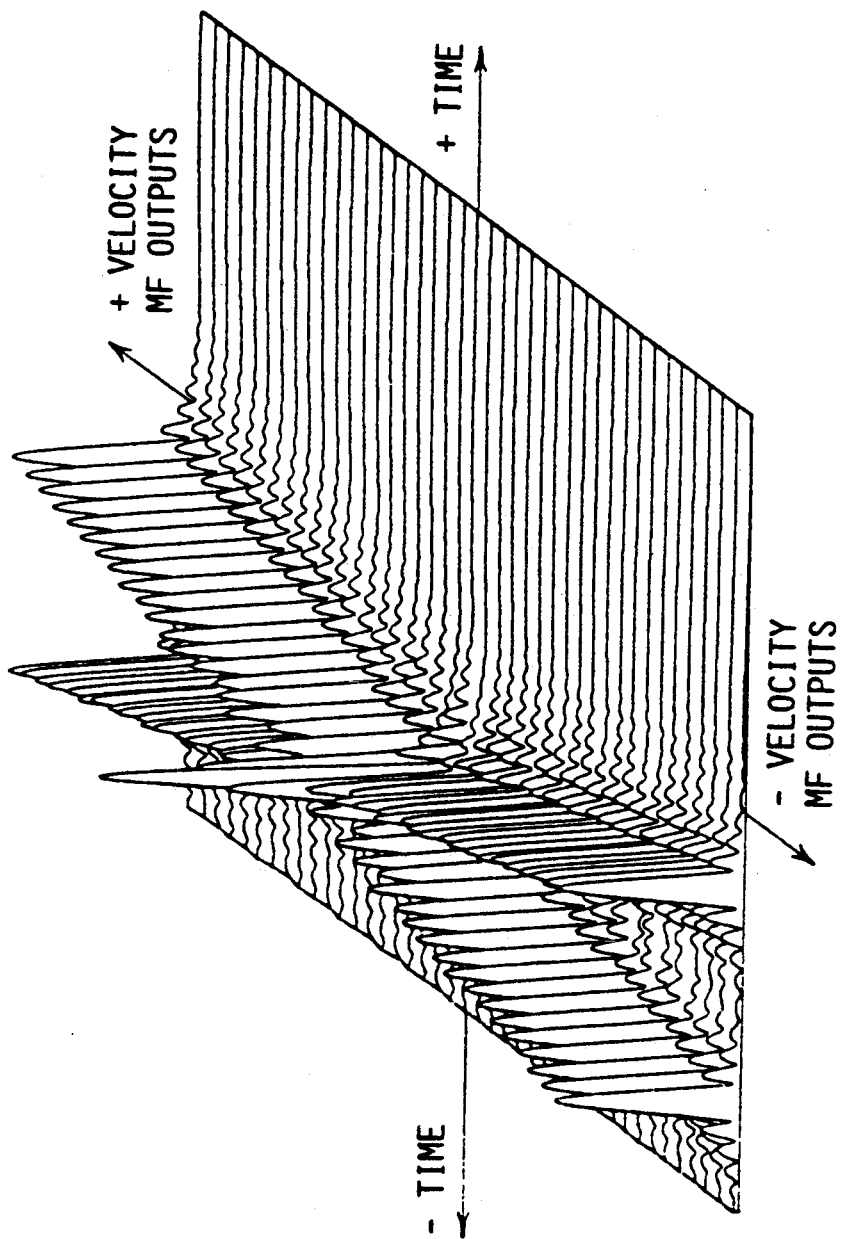
FIG. 14 is a plot in ambiguity space from a computer simulation of an output distribution resulting from a return from a reverberator on the zero time axis of the plot.
Figure 15:
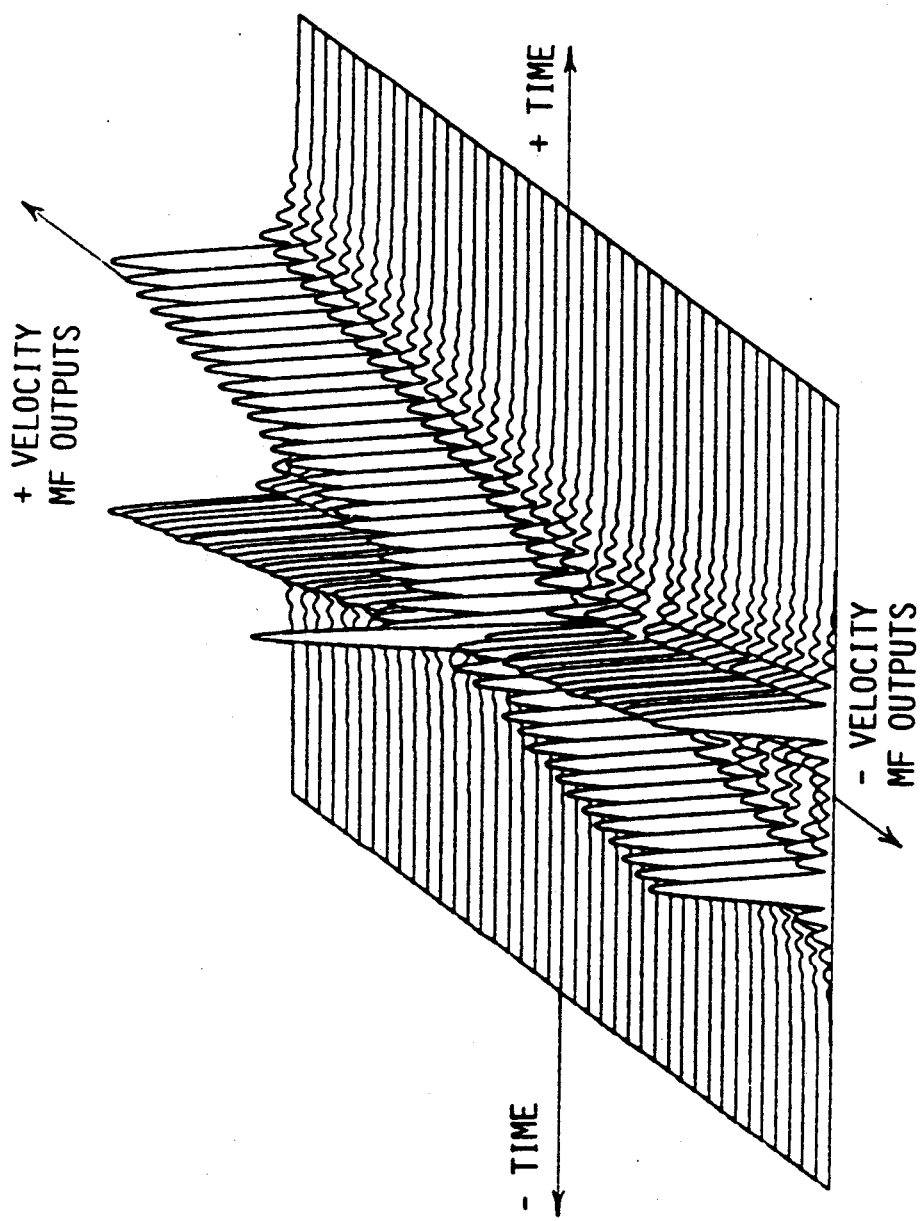
FIG. 15 is a plot similar to FIG. 14 for a return from a −2 knot (KT), incoming target.
Figure 16:
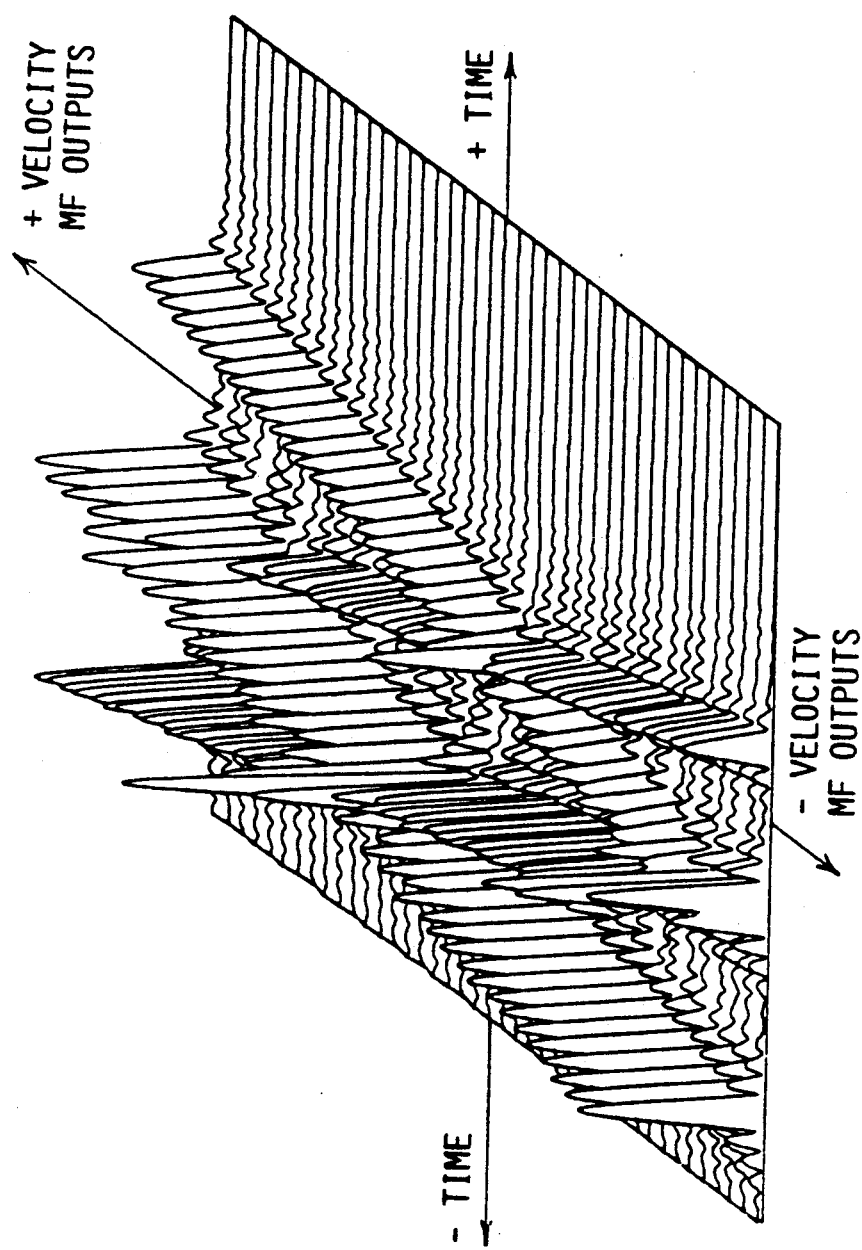
FIG. 16 is a plot similar to FIG. 14 for returns from a −2 KT target and a zero velocity reverberator displaced in time.

Referring to FIG. 14, there is shown a composite simulation of the output distribution of slope-adjusted matched filter outputs for a zero-velocity reverberator displaced to the left of zero time, but like the reverberator shown in FIG. 13A. The FIG. 14 distribution is for a typical single-point stationary reverberator. FIG. 15 shows the output distribution for a −2 knot target occurring at zero relative time. FIG. 16 shows the combined output distribution with two pairs of crossed ridge lines for the two returns shown in FIGS. 14 and 15. The target echo strength has been reduced by 6 dB to emphasize the performance of the reverberation suppression in accordance with the invention.

Figure 17:
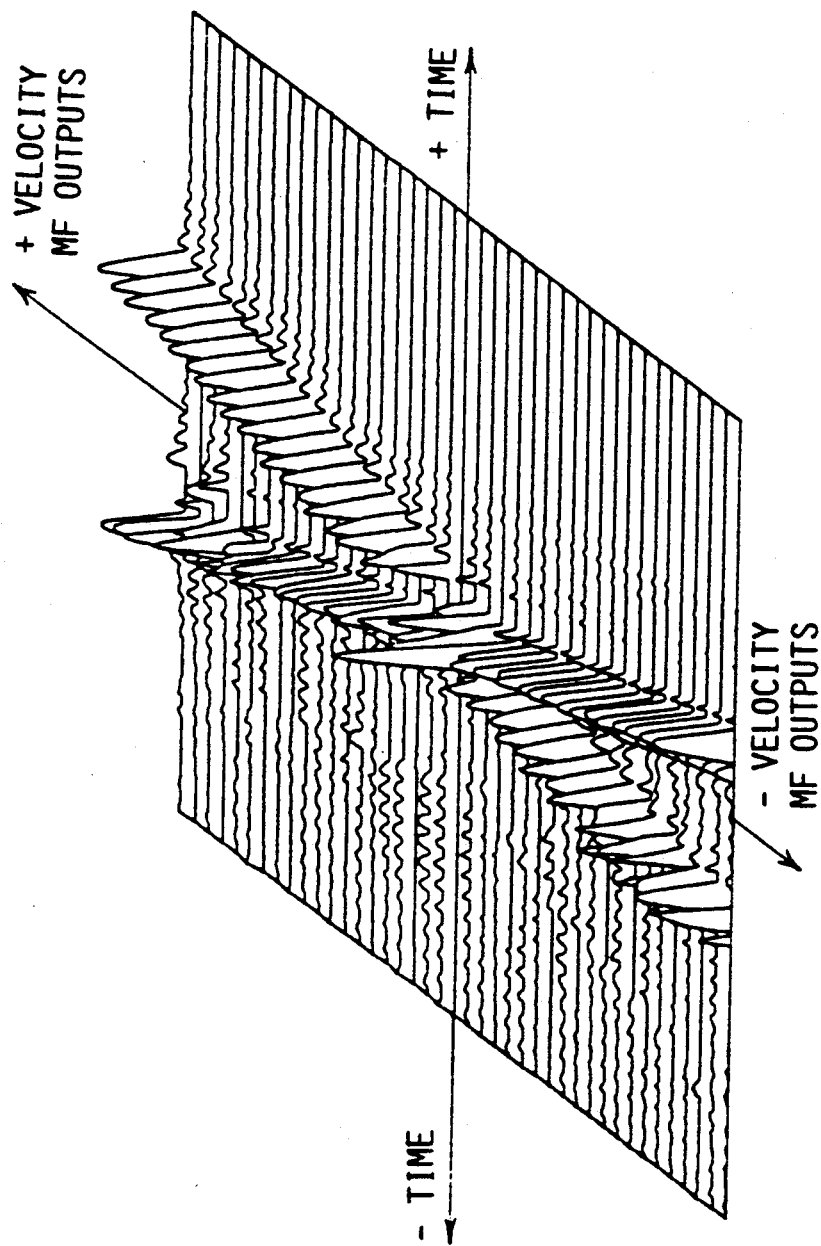
FIG. 17 is a plot similar to FIG. 14 for simulated returns from the target and reverberator shown in FIG. 16 showing the reverberator's return suppressed by operation of the reverberation suppressing processor of the present invention.

The suppressor is nonactive for the case illustrated in FIG. 16. With the suppressor activated, the output distribution illustrated in FIG. 17 is obtained, showing that the reverberator has been essentially eliminated, while the non-zero velocity target is virtually unchanged and can be readily detected by the maximum amplitude detector (22, FIG. 9).

In FIGS. 13-17, the negative image of the echo return in the suppressor's outputs has not been shown. This image is suppressed by zero clamping using clamping circuits 70 as shown in FIG. 11. However, the negative outputs may be used along with the positive outputs, if desired, in a companion pattern recognition process.

FIG. 18-26 show that the reverberation and false target suppressor can be used to suppress a plurality of selected non-zero velocity false targets and to form a "Doppler notch" of finite bandwidth to suppress, for example, reverberation whose spectrum is smeared, such as example, surface reverberation. The process can be implemented sequentially, as it will be described, or preferrably instantaneously, as provided in the schematic diagrams of FIGS. 24 and 25. Sequential suppression involves a plurality of rotations or folding about different velocity time axes. Then storage means must be used ahead of the maximum amplitude detector to retain the outputs resultant from each rotation or fold and subtraction and the maximum amplitude detector is inhibited until all subtraction processes have been completed.

Figure 18:
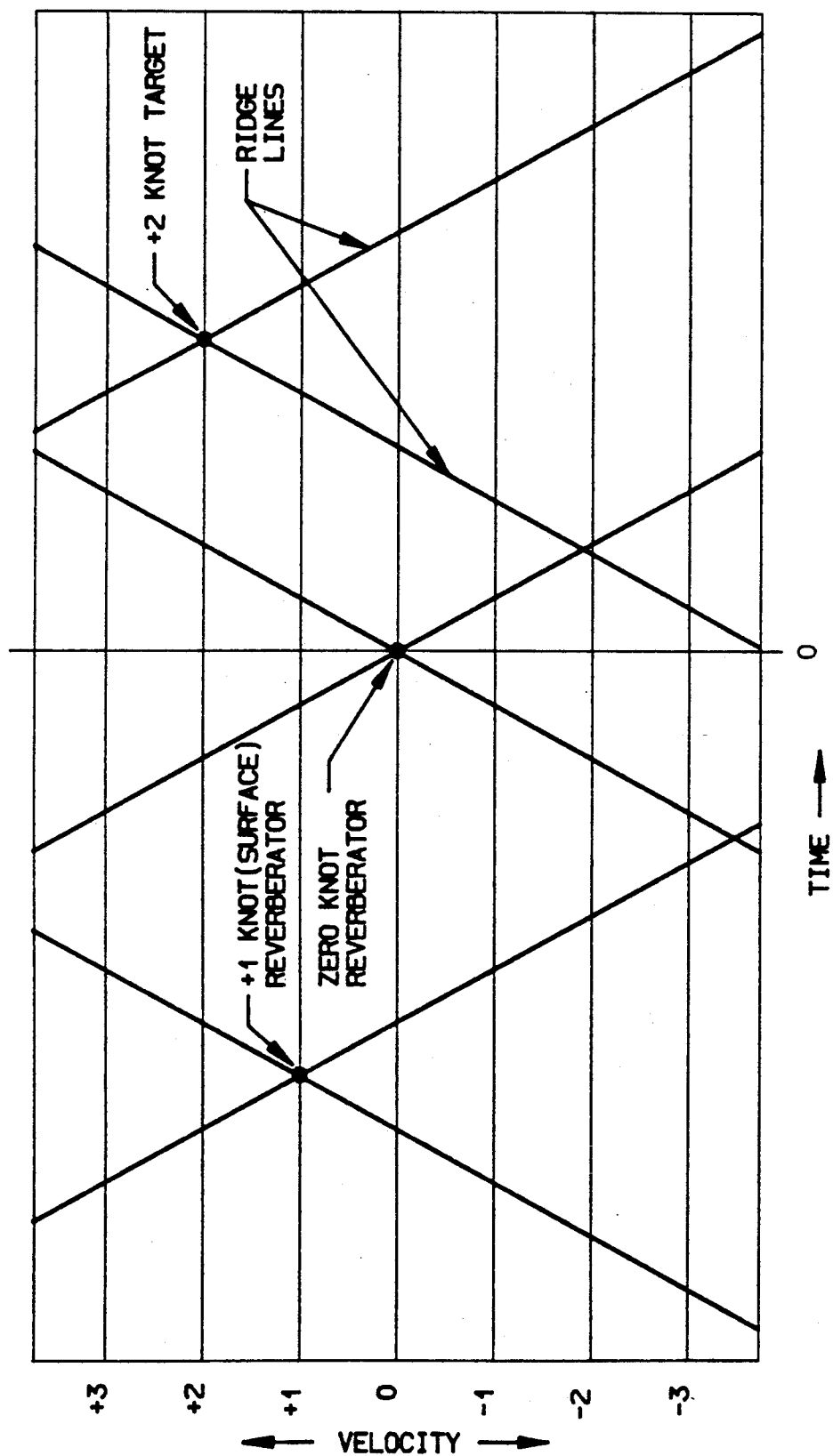
FIG. 18 is a top view in ambiguity space of a zero velocity reverberator, a +2 KT target and a +1 KT reverberator, which may be an elementary surface reverberator.

First, a tutorial case of one zero velocity and two non-zero (positive) velocity detections is considered. FIG. 18 shows the plan view of the detector outputs in ambiguity space as function of time and velocity. In this view, only positive excursions can be present (this is the assumed output of a positive polarity detector), and are indicated with solid lines. On successive figures, negative excursions will show as dotted lines. A 2 knot target, which is to be detected, and 1 knot surface and zero knot reverberators, which are to be suppressed, are shown. The reverberators may be thought of as elements of a continuum of reverberators.

Figure 19:
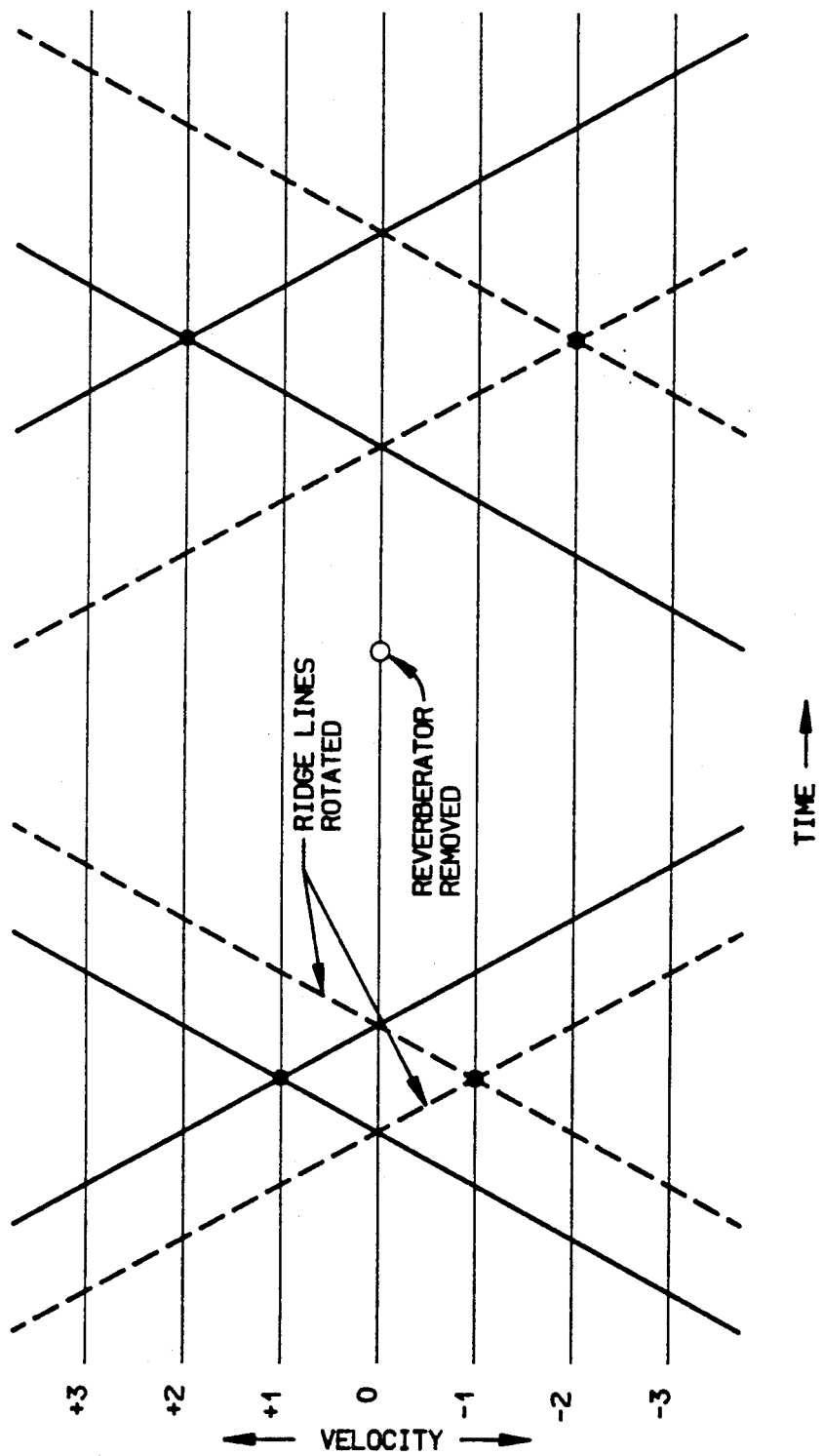
FIG. 19 is a top view similar to FIG. 18 after reverberation suppression processing by a single rotation or fold of a replica of the adjusted output distribution about the zero velocity time axis and a single subtraction operation, the dash lines indicating negative excursions.

FIG. 19 shows the view with a zero velocity rotation and combination done. The zero velocity reverberator has disappeared. The positive velocity target and reverberator now appear not only as themselves, but also as a negative versions at equal but opposite negative velocity.

Figure 20:
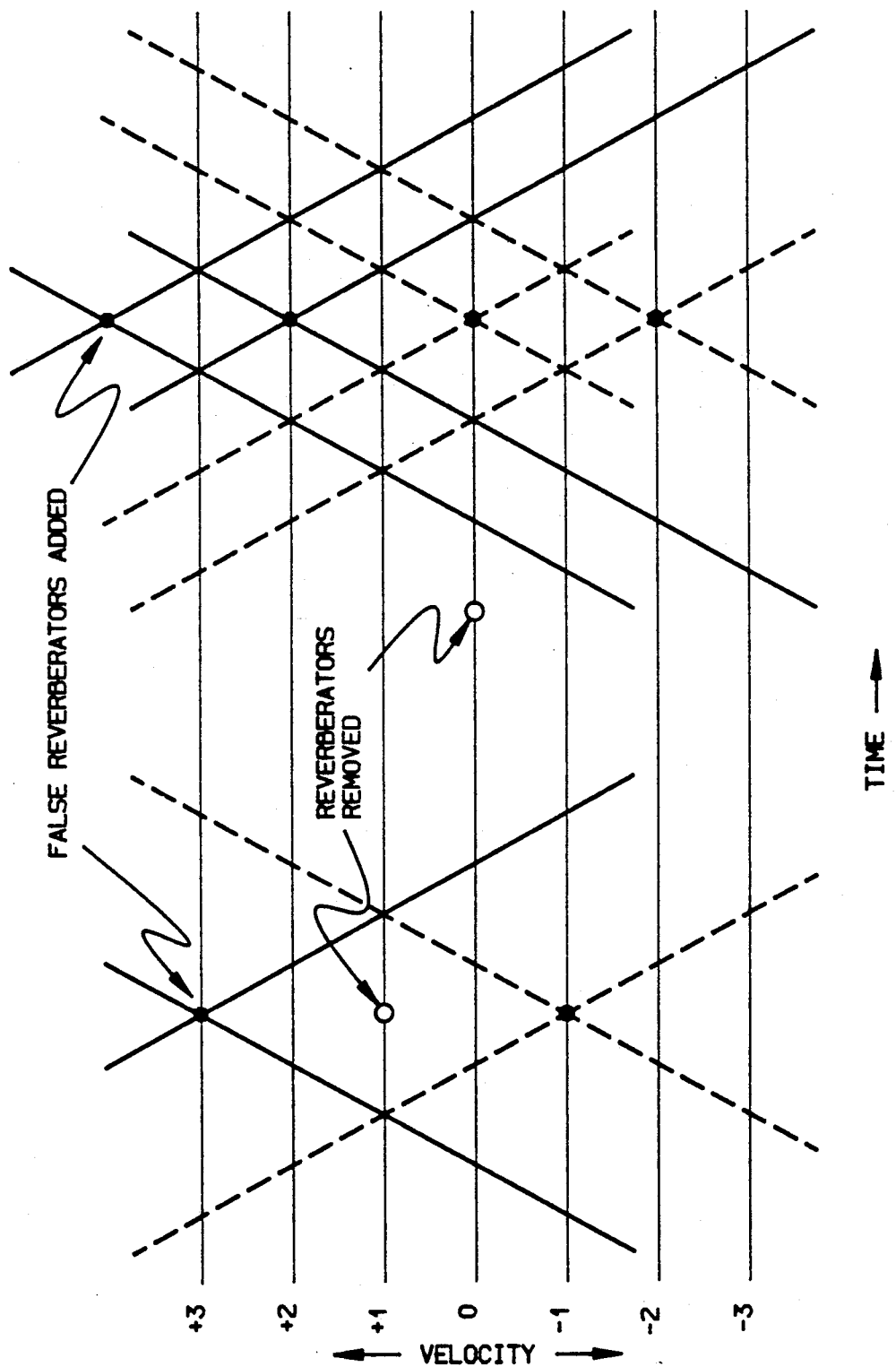
FIG. 20 is a top view similar to FIG. 19 after a second rotation about the positive-velocity time axis of the reverberator on the left side of the view, again with full lines showing Positive and dash lines showing negative excursions.

FIG. 20 shows the view after a second rotation and combination about the 1 knot-velocity time axis. The 1 knot reverberator is now cancelled, but a new false reverberator appears at a velocity of 3 knots. The 2 knot target appears as itself and as itself duplicated at twice its velocity.

Figure 21:
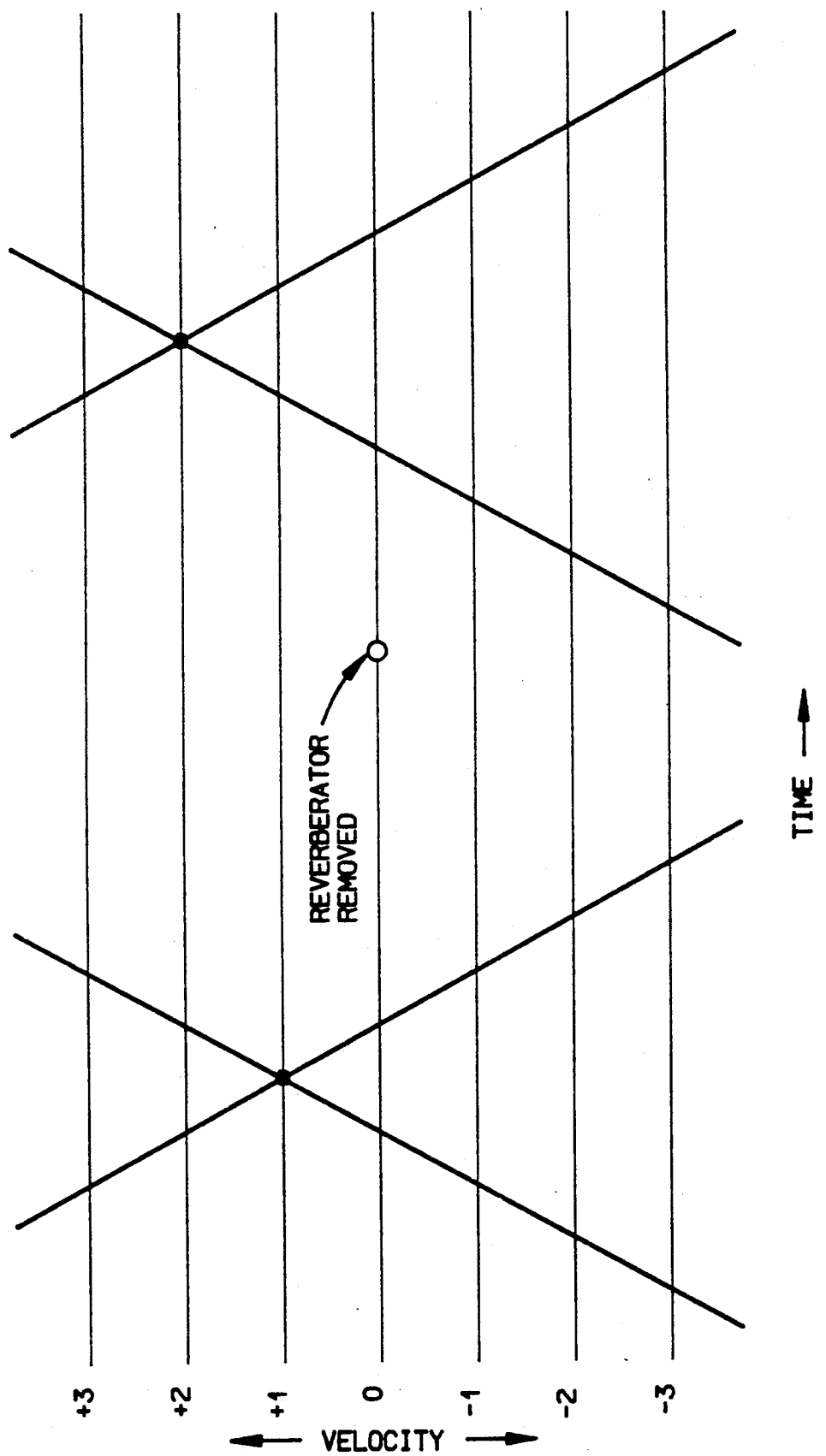
FIG. 21 is a top view similar to FIG. 19 where the outputs of the distribution from the subtraction operation are clamped to zero for negative excursions.

This process is not acceptable. It may, however, be made acceptable by providing for the negative clamp, as described above, prior to the second inversion/subtraction. FIG. 21 shows the pattern of FIG. 19 after this clamp has been applied, and FIG. 22 shows the view after the successive rotation about the +1 knot-velocity time axis, and the subsequent combination. The +1 knot reverberator disappears, and the target at +2 knots remains only as itself, showing successful supression of the reverberators.

The above discussion has treated the suppression of unwanted returns that appear as point detections such as might occur from individual sea mounts (zero velocity), or a moving surface segment. It is desirable to remove reverberation that may appear as a continuum in time as the transmit pulse interacts with the bottom at ever-increasing range.

An example of such continuum processing is shown in FIGS. 23A through 23F which include the representation, by computer simulation, of bottom (zero Doppler) reverberation characterized by a random function of time, convolved with the transmit signal.

Figure 23A:
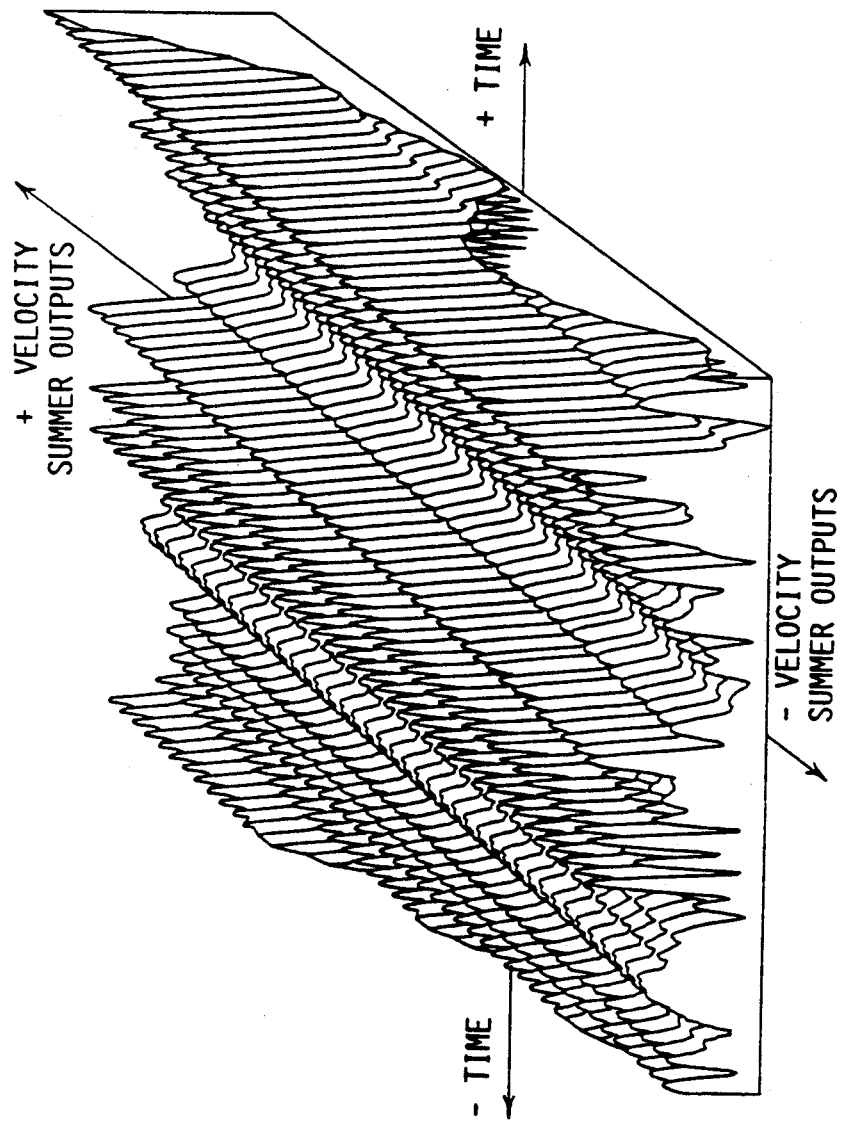
Figure 23B:
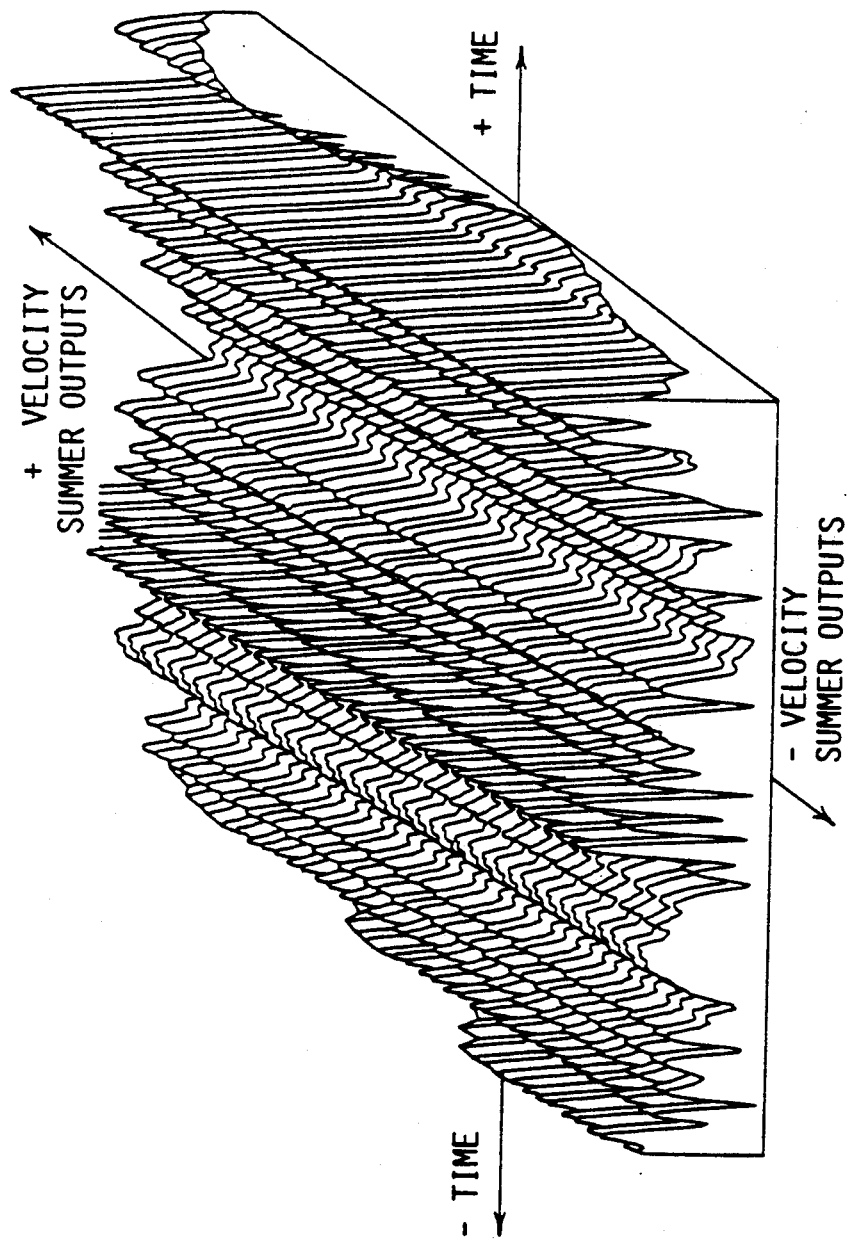

FIGS. 23A and 23B show the time-randomized zero Doppler reverberation, as it might appear in the output distribution of the matched filter bank of the processor of FIG. 11, for, respectively, the HFM upsweep and the HFM downsweep, representing the building blocks of the composite Doppler invariant transmitted signal.

Figure 23C:
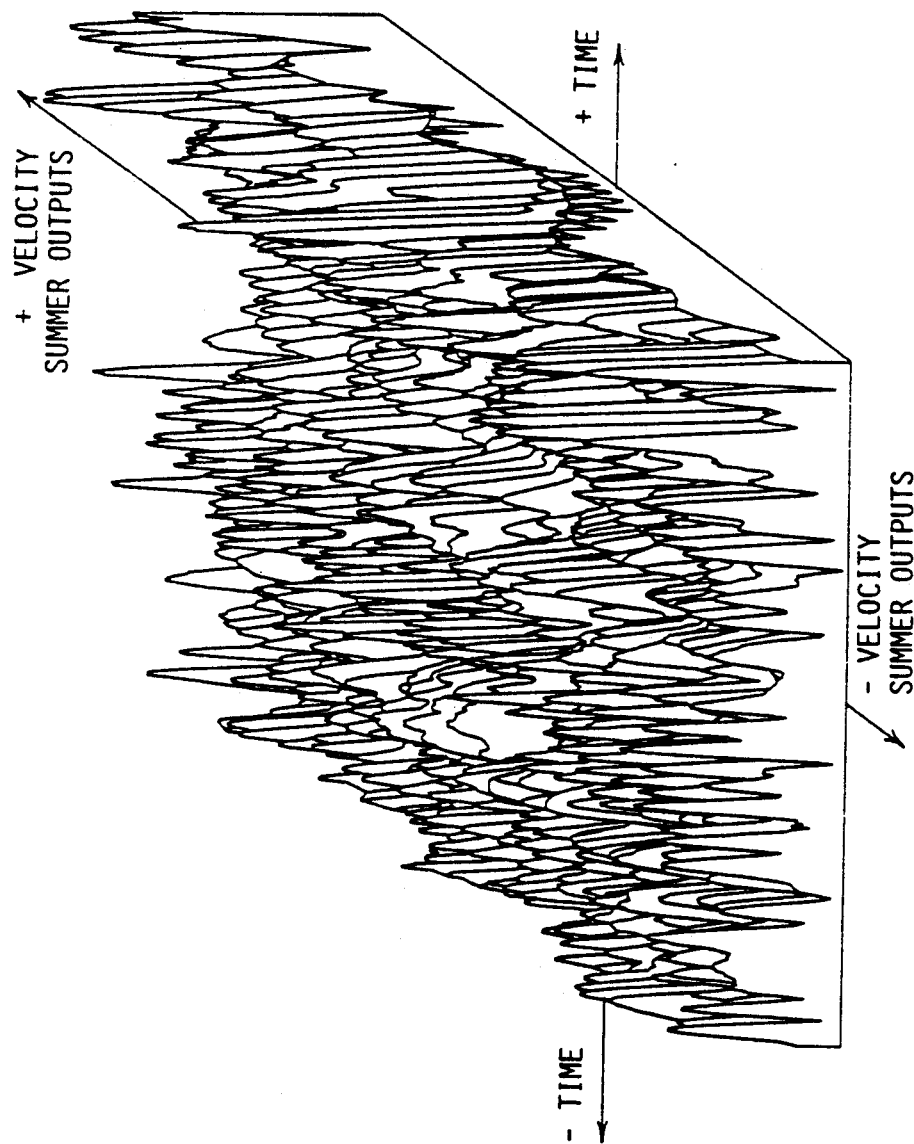

FIG. 23C shows the combined distribution when the individual segments are connected together as a rooftop HFM transmission. Note that the output distribution (of reverberation) has a random character in both the velocity and time directions.

Figure 23D:
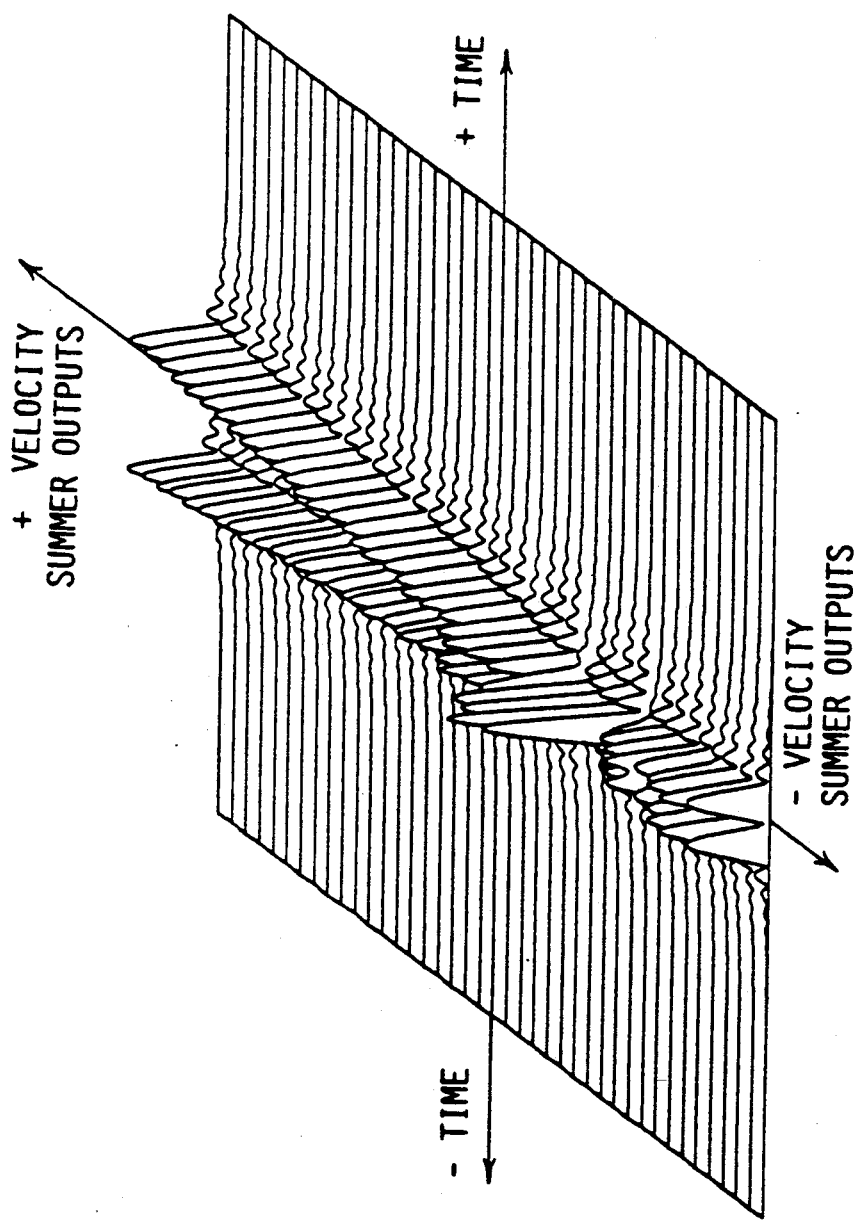

FIG. 23D illustrates the output that would occur for a −2 knot target in the absence of any background (noise or reverberation).

Figure 23E:
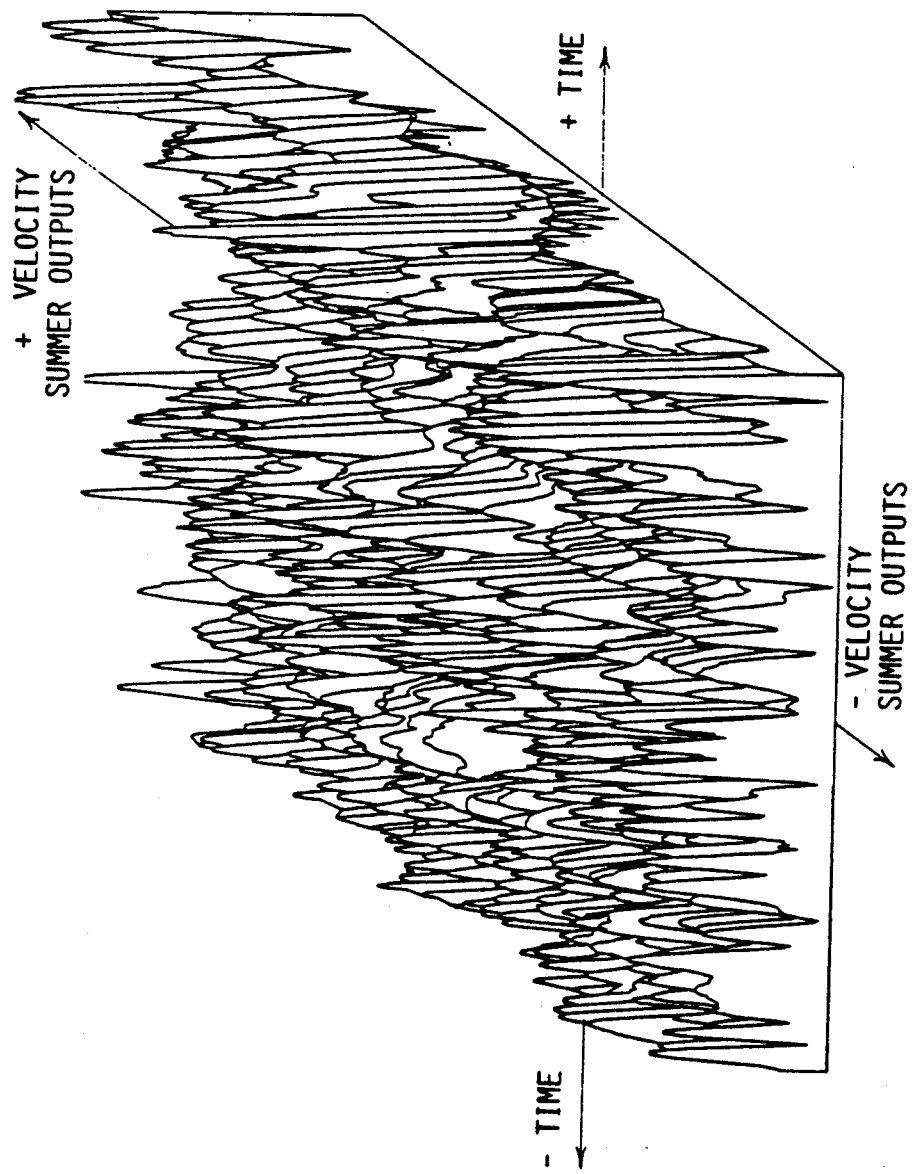

FIG. 23E shows the combination of the target signal with the reverberant background, with the reverberation peaks 6 dB above the target peak return. The target's presence cannot be detected with the naked eye.

Figure 23F:
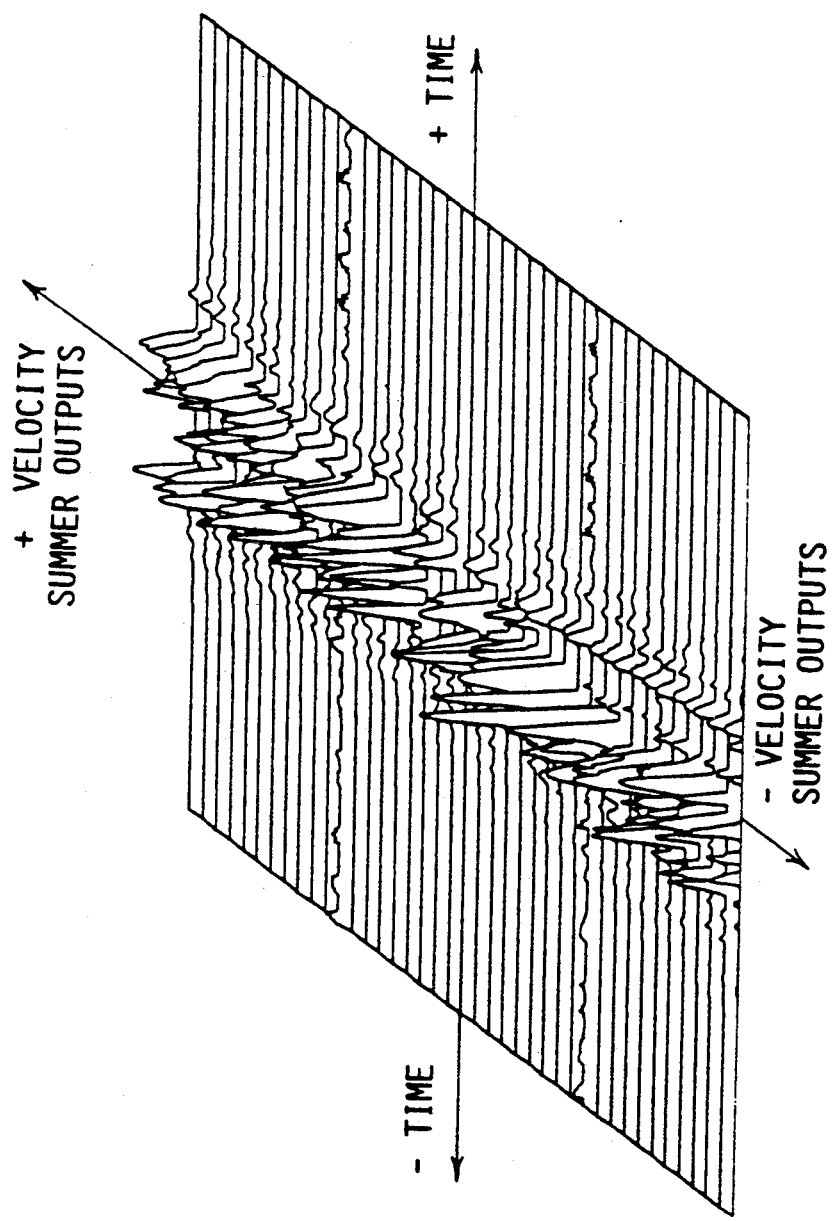

FIG. 23F shows the output distribution with the processor of FIG. 10 or 11 invoked to suppress zero-Doppler returns. The target return at −2 knots is now clearly visible, and the output distribution with the reverberation continuum suppressed is not significantly different from the distribution of FIG. 17 where the reverberator was a point reverberator.

Accordingly, the suppression process has been shown to operate equally effectively against point reverberators or a continuum of reverberation, and will work against zero velocity reverberators or for reverberation that has a velocity component.

It is desired also to provide a suppression of reverberation over a band of Doppler returns as may result from reverberant energy returning from moving surface waves whose effect may be to smear the Doppler shifts of such reverberant returns. Such suppression may be accomplished by multifold subtraction, an example of which is shown hereinafter.

FIG. 24 shows the processor of FIG. 11 interconnected to provide for three-fold subtraction. For simplicity, the slope adjustor networks have been omitted, as if slope adjustment was performed on the transmitted signal. Furthermore, also for simplicity, only the interconnections for taps +18, +19, +20 and −18, −19, −20 are shown. Similar interconnections may be implemented for the other velocity bins.

The objective of the example shown in FIG. 24 is to provide, for each velocity bin, an elimination of its output response for a Doppler band centered about zero Doppler with a width of ±one-half of a bin width. Thus, for example, if each bin number happened to correspond to one knot of Doppler shift, the Doppler suppression of the interconnections explicitly shown would be for a bandwidth of ±½ knot centered about zero velocity, for the +19 knot bin (and for the −19 knot bin). It is to be recognized that whereas bin 19 will output the peak signal from a crossed-ridgeline detection of a 19 knot target, it will also output a (lower amplitude) ridgeline response from a zero velocity return. The process just discussed eliminates that zero velocity response, as well as response out to ±½ knot.

The ½ knot half-bandwidth emerges from the interpolation of the interconnections shown, i.e., between the delay line taps for bins 19 and −18, and, for −½ knot, between the delay line taps for bins 19 and −20. The interconnections between the taps for bins 19 and −19 duplicate the interconnections for the single fold of FIG. 11. The total bandwidth of the notch in this example is 1 knot.

The subtraction process, as shown in FIG. 24, proceeds, for example, by collecting the detected outputs feeding bins −18, −19, and −20 in a negative sum adder (e.g., 80) and then directing the output of this adder to the (−) minus terminal of the subtractor whose (+) positive terminal connects to the detected bin 19 output. The combined output of the subtractor is the new bin 19 output with response to the ±½ Doppler bin width suppressed. The new bin output may also include the provision for zero clamping of negative excursions as set forth in FIG. 11.

The above description extends, by example, to the construction of a set of 2n−2 new bin outputs which possess each the nulled response to the zero ±½ bin width Doppler band. The process above-described can be extended to cover notch widths of arbitrary extent, either centered about zero velocity or some other non-zero velocity.

Referring to FIG. 25, there is shown a processor as shown in FIG. 24, especially suitable for subtracting large reverberators embedded within a noise background. Instead of adding the three summer outputs together prior to subtracting as in FIG. 24, which process may inadvertantly add deleterious noise, they are peak detected in peak detectors 90 and 92. The peak detectors output only the largest of the three outputs, which process effectively acts as a single fold rotation/subtraction operation, effective over a broadened bandwidth on the largest reverberator.

It will be appreciated that the outputs to the adders 80 and 82 or the peak detectors 90 and 92 may come from a matched filter embodying a bank of correlators, as shown in FIG. 10, as well as from a dual correlator and summer system of the type described in the above-referenced application and shown in FIG. 11.

FIG. 26 shows the effective Doppler notch for a nine-fold subtraction process, symmetrically placed with respect to zero velocity, using the peak detector concept of FIG. 25. The same result would be obtained using the negative sum adders of FIG. 24. FIG. 26 illustrates the composite response of the detector to unit-amplitude velocity-matched excitation for each velocity bin.

The total notch width in FIG. 26 is, effectively, four bin widths wide. This comes about, as previously described, since the null velocity for each fold is half way between the output bin being observed and the channel to which the negative peak detector or the negative sum adder is connected for that fold. If each bin in the example corresponded to 1 knot of velocity, the total notch width would cover ±2 knots centered about zero velocity.

The notch width, N, in bin widths, is generally given by the expression $N=(n-1)/2$ where n is the number of folds.

From the foregoing description, it will be apparent that there has been provided an improved echo ranging system using a composite Doppler invariant-like signal which provides both velocity and range sensitive detection from a single transmission using a composite Doppler invariant signal, and wherein unwanted returns (zero velocity reverberations or clutter or false targets at any or over a range of velocities) can be suppressed. Variations and modifications in the herein described embodiments of the invention, within the scope of the invention, will undoubtedly suggest themselves to those skilled in the art. Accordingly, the foregoing description should be taken as illustrative and not in a limiting sense.

We claim:

1. An echo ranging system for determining simultaneously the range and velocity of moving targets and for suppressing unwanted returns including reverberation, clutter and returns from false targets, said system comprising:

means for transmitting a composite signal comprised of at least two segments, each having Doppler invariant-like characteristics as well as a time-bandwidth product greater than unity, said composite signal also having an ambiguity function in velocity-time space, said space having velocity and time axes that are perpendicular, said ambiguity function having at least a first pair of ridge lines which intersect along the zero-velocity time axis, each ridge line of said at least first pair having a different slope with respect to said zero-velocity time axis;

means for receiving echo returns from said transmitted signal;

a bank of matched filters;

means for passing said echo returns through said bank of matched filters to provide a distribution of outputs which characterize the range and velocity properties of said echo returns;

detection means operative upon said outputs for providing an ambiguity function-like detected output distribution in velocity-time space, said output distribution being formed by intersecting second pairs of ridge lines, said intersections occurring uniquely in time and velocity to define individually the range and velocity of said echo returns;

means for adjusting at least one ridge line of each said second, intersecting ridge line pair of said distribution to make the slopes of said ridge lines of said second, intersecting ridge line pairs equal and opposite with respect to the time axis to provide an adjusted output distribution;

means for providing continuously a replica of said adjusted output distribution rotated 180° about the time-axis containing the intersection of a ridge line pair corresponding to an unwanted return;

means for combining said rotated adjusted replica of said output distribution with said adjusted output distribution in time alignment to obtain a combined distribution in which said unwanted return is suppressed; and means responsive to said combined distribution for providing the range and velocity of said moving targets.

2. The system according to claim 1 wherein said bank of matched filters comprises a bank of correlators whose individual replicas are a set of N of said composite signals whose individual time bases have been adjusted to match N velocities to be detected, the outputs of said correlators forming said distribution outputs.

3. The system according to claim 1 wherein said bank of matched filters includes a plurality of correlators, each correlator having, as a signal replica, a different one of the segments of said composite signal; said correlators transforming the frequency shift of said target returns due to the velocities thereof into outputs occurring in time delay relationships corresponding to the velocities and ranges of said targets; and means including a tapped delay and summer matrix through which said outputs of said correlators are coherently combined for providing said distribution of outputs.

4. The system according to claim 1 further comprising means operative upon said combined distribution for clamping said combined distribution to prevent the outputs thereof being other than the same polarity.

5. The system according to claim 1 wherein said means for providing said rotated replica includes means for providing a plurality of said rotated replicas each about a different time axis corresponding to a different velocity, and said combining means includes means for combining said plurality of replicas with said adjusted output distribution to obtain said combined distribution.

6. The system according to claim 1 further comprising means for obtaining said combined distribution by operating said rotated replica providing means and said combining means successively a plurality of times in each of which said rotation is about a different time axis corresponding to a different velocity.

7. The system according to claim 5 wherein said means for obtaining said combined distribution includes means for selecting said different axes to include the time axis at zero velocity and time axes at velocities above and below said zero velocity-time axis to provide a Doppler-notch of width containing said unwanted returns.

8. The system according to claim 6 wherein said means for obtaining said combined distribution includes means for selecting said different axes to include the time axis at zero velocity and time axes at velocities above and below said zero velocity-time axis to provide a Doppler-notch of width containing said unwanted returns.

9. The system according to claim 2 wherein said adjusting means comprises means for changing at least one of the duration and bandwidth of at least one segment of each pair of said composite signal segments to make at least one ridge line of each of said second pairs of ridge lines in said output distribution equal and opposite in slope to the other ridge line in said second pairs of ridge lines.

10. The system according to claim 2 wherein said adjusting means comprises adjustable delays for outputs of said output distribution from said matched filters which make at least one ridge line of each of said second pairs of ridge lines in said output distribution equal and opposite in slope to the other ridge line in said second pairs of ridge lines.

11. The system according to claim 3 wherein said adjusting means comprises means for changing at least one of the duration and bandwidth of at least one segment of each pair of said composite signal segments to make at least one ridge line of each of said second pairs of ridge lines in said output distribution equal and opposite in slope to the other ridge line in said second pairs of ridge lines.

12. The system according to claim 3 wherein said adjusting means comprises means for incrementally readjusting delays for the outputs of said output distribution from said tapped delay and summer matrix to make at least one ridge line of each of said second pairs of ridge lines in said output distribution equal and opposite in slope to the other ridge line in said second pairs of ridge lines.

13. The system according to claim 12 wherein said tapped delay includes a plurality of sections which are connected to summers of said summer matrix, and said means for incrementally adjusting delays comprises means for delaying the outputs from each of said summers to make each of said second pairs of ridge lines in said output distribution equal and opposite in slope.

14. The system according to claim 3 further comprising means responsive to the one of said outputs of said combined distribution of outputs which is of greater amplitude than the others of said outputs of said combined distribution of outputs for providing the velocity and range of one of said targets.

15. An echo ranging system for determining the range and velocity of moving targets, and for suppressing unwanted returns as from reverberation, clutter, or false targets, including reverberation or false targets appearing with a velocity v, where v may be zero or nonzero, said system comprising:
  means for transmitting a signal of total duration T having a time-bandwidth product greater than unity and an ambiguity function that is distributed symmetrically about the time axis corresponding to zero velocity in time-velocity space;
  means for receiving echo return signals from moving targets as well as unwanted echo return signals from said reverberation, clutter, or false targets appearing with said velocity v, said unwanted return signals having an ambiguity function that is symmetrical about the time axis corresponding to said velocity v in time-velocity space;
  a bank of matched filters, each filter of said bank having a signal replica corresponding to a different target velocity;
  means for passing said echo return signals through said bank of matched filters to provide a distribution of outputs which characterize the range and velocity of said echo returns;
  means for providing continuously a replication of said output distribution rotated 180° about the time axis corresponding to said velocity v;
  means for combining said rotated output distribution with said distribution of outputs in time alignment to obtain a combined distribution in which said unwanted returns are suppressed; and
  means responsive to said distribution for providing the range and velocity of said moving targets.

16. The system according to claim 15 wherein said receiving means includes means for adjusting said return signals to provide the symmetry of said ambiguity function about said time axis corresponding to said velocity v.

17. The system according to claim 15 wherein said means for providing said replication of said output distribution is operative to repeat said rotation sequentially or simultaneously about neighboring time axes whereby said combining means forms in said combined distribution a Doppler notch.

18. The system according to claim 15 further comprising means operative upon said combined distribution for clamping said combined distribution to prevent the outputs thereof being other than the same polarity.

19. The system according to claim 15 wherein said transmitting means includes means for adjusting the signal which is transmitted to provide said unwanted return signals with said ambiguity function that is symmetrical about the time axis corresponding to said velocity v in time-velocity space.

20. The system, according to claim 15, further comprising means for adjusting at least one of the signal which is transmitted and said distribution of outputs to make said distribution symmetrical with respect to the time axis corresponding to said velocity v in velocity-time space, wherein said output distribution provided by said replication means is the adjusted output distribution provided by said adjusting means, and wherein said combining means operates to combine said adjusted output distribution with the replication of said adjusted output distribution rotated 180° about said time axis corresponding to said velocity v.

21. The system according to claim 15 wherein said transmitted signal has Doppler invariant-like characteristics.

22. The system according to claim 15 wherein said means for passing said echo return signals includes means for providing each output of said distribution of outputs as an output coherently processed over said total duration T.

* * * * *